(12) United States Patent  
Orrico et al.

(10) Patent No.: US 7,217,908 B2  
(45) Date of Patent: May 15, 2007

(54) MICROWAVABLE BEVERAGE MAKER

(75) Inventors: Mario Orrico, Chicago, IL (US); Stuart Kofard, Winchester, OH (US); Rudy Avramovich, Libertyville, IL (US)

(73) Assignee: Micro Lungo, Inc., Chicago, IL (US)

( * ) Notice: Subject to any disclaimer, the term of this patent is extended or adjusted under 35 U.S.C. 154(b) by 0 days.

(21) Appl. No.: 11/082,535

(22) Filed: Mar. 17, 2005

(65) Prior Publication Data

US 2005/0204925 A1    Sep. 22, 2005

Related U.S. Application Data

(60) Provisional application No. 60/554,877, filed on Mar. 19, 2004.

(51) Int. Cl.  
*H05B 6/80* (2006.01)  
*A47J 31/10* (2006.01)

(52) U.S. Cl. .............. 219/689; 219/729; 99/302 R; 99/306; 99/DIG. 14; 426/241

(58) Field of Classification Search ........ 219/687–689, 219/728–729; 99/299–300, 304, 306, 302 R, 99/DIG. 14; 426/241  
See application file for complete search history.

(56) References Cited

U.S. PATENT DOCUMENTS

| | | | |
|---|---|---|---|
| 3,757,670 A | 9/1973 | Laama et al. ................ 99/302 |
| 4,104,957 A | 8/1978 | Freedman et al. ............ 99/283 |
| 4,345,512 A | 8/1982 | Moore ......................... 99/323 |
| 4,381,696 A | 5/1983 | Koral .......................... 99/304 |
| 4,386,109 A | 5/1983 | Bowen et al. .............. 426/241 |
| 4,498,375 A | 2/1985 | Bedini ........................ 99/303 |
| 4,577,080 A | 3/1986 | Grossman ........... 219/10.55 E |
| 4,642,443 A | 2/1987 | Jorgensen et al. .......... 219/689 |
| 4,721,835 A | 1/1988 | Welker ................ 219/10.55 E |
| 4,990,734 A | 2/1991 | Hirsch et al. ........ 219/10.55 E |
| 5,012,059 A | 4/1991 | Boatman .................... 219/689 |
| 5,281,785 A | 1/1994 | Pasbrig ................ 219/10.55 E |
| D386,644 S | 11/1997 | Orrico et al. ................ D7/300 |
| D394,187 S | 5/1998 | Orrico et al. ................ D7/533 |
| 5,747,782 A | 5/1998 | Orrico et al. ................ 219/689 |
| 5,832,809 A * | 11/1998 | Gras .......................... 99/299 |
| 5,884,551 A | 3/1999 | Orrico et al. .................. 99/317 |
| 6,026,733 A | 2/2000 | Orrico et al. ............. 99/302 R |

FOREIGN PATENT DOCUMENTS

DE       OS 3206803        9/1982

* cited by examiner

*Primary Examiner*—Philip H. Leung  
(74) *Attorney, Agent, or Firm*—McAndrews, Held & Malloy, Ltd.

(57) ABSTRACT

A removable filter/pod compartment is filled with coffee grounds, tea, or other espresso particulate brewing substance and mounted within a water reservoir. Water is placed in the water reservoir. A bottom cover is connected to upper cup assembly to hold the filter/pod compartment in place. A resilient gasket or valve is positioned between the filter/pod compartment and a filtrate passage. A filtrate splash cover may be attached to the upper edges of the filtrate reservoir. The assembled beverage maker is placed into a microwave oven. As water in the water reservoir begins to heat up, steam is generated, and hot water is displaced upwards through the filter/pod compartment and particulate brewing substance. The heated beverage is automatically emptied into the filtrate reservoir, which is designed to function as a drinking cup for individually-sized portions.

33 Claims, 15 Drawing Sheets

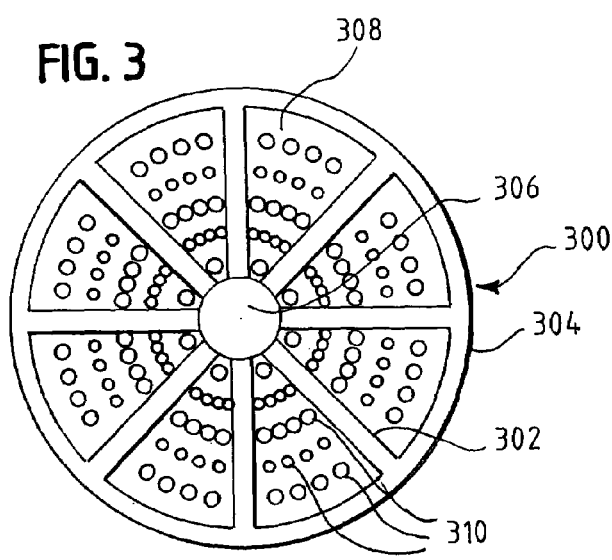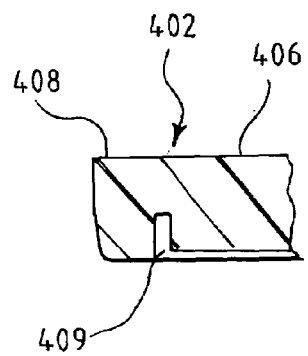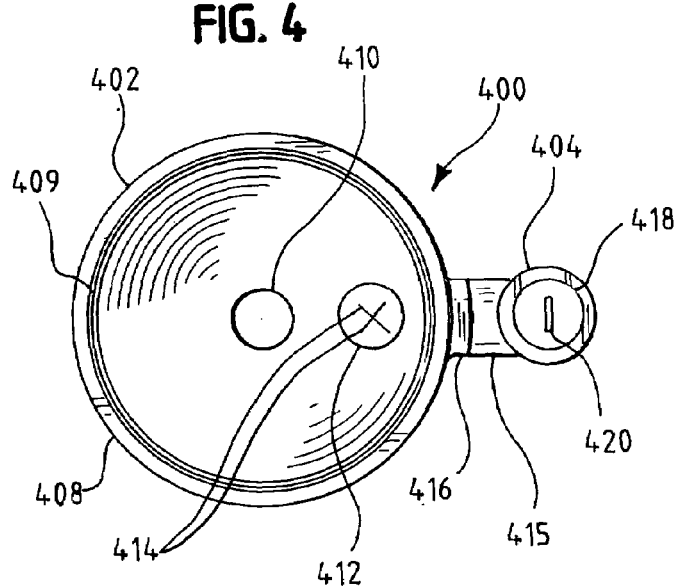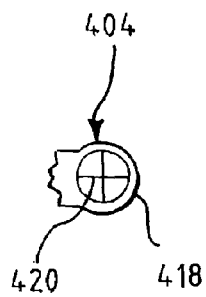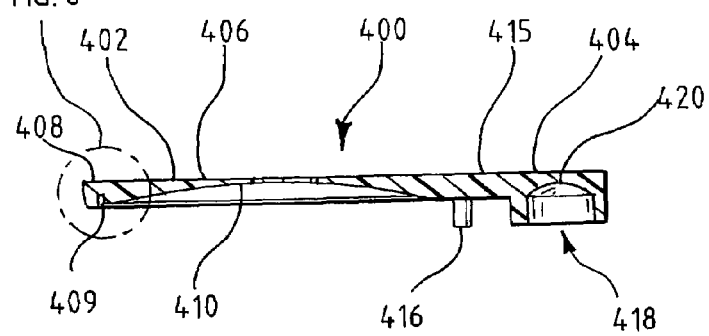

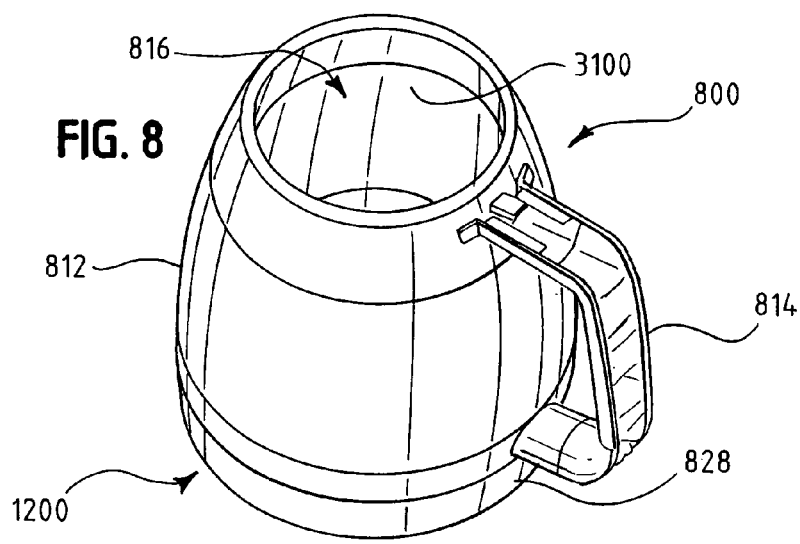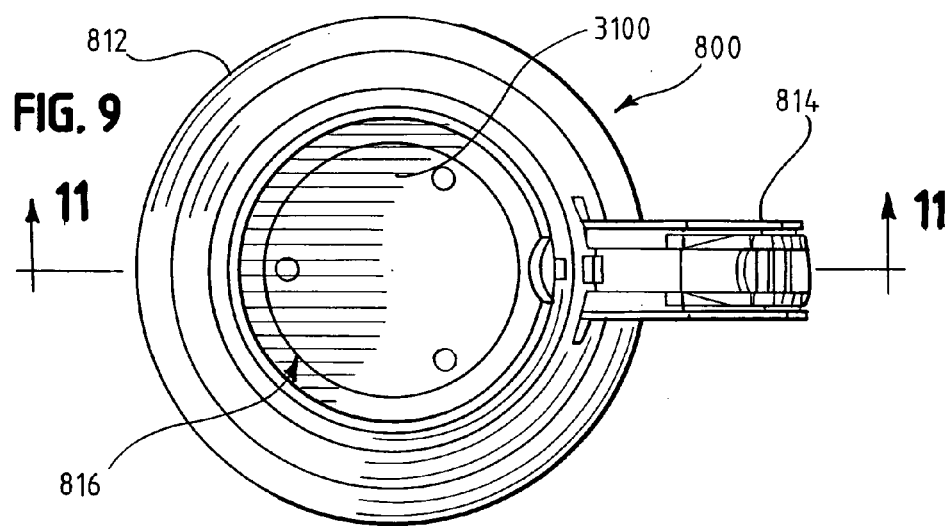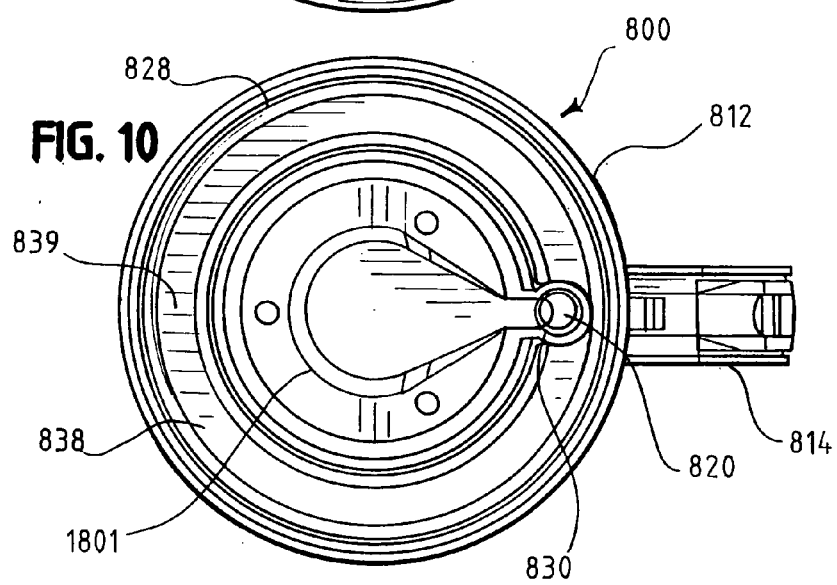

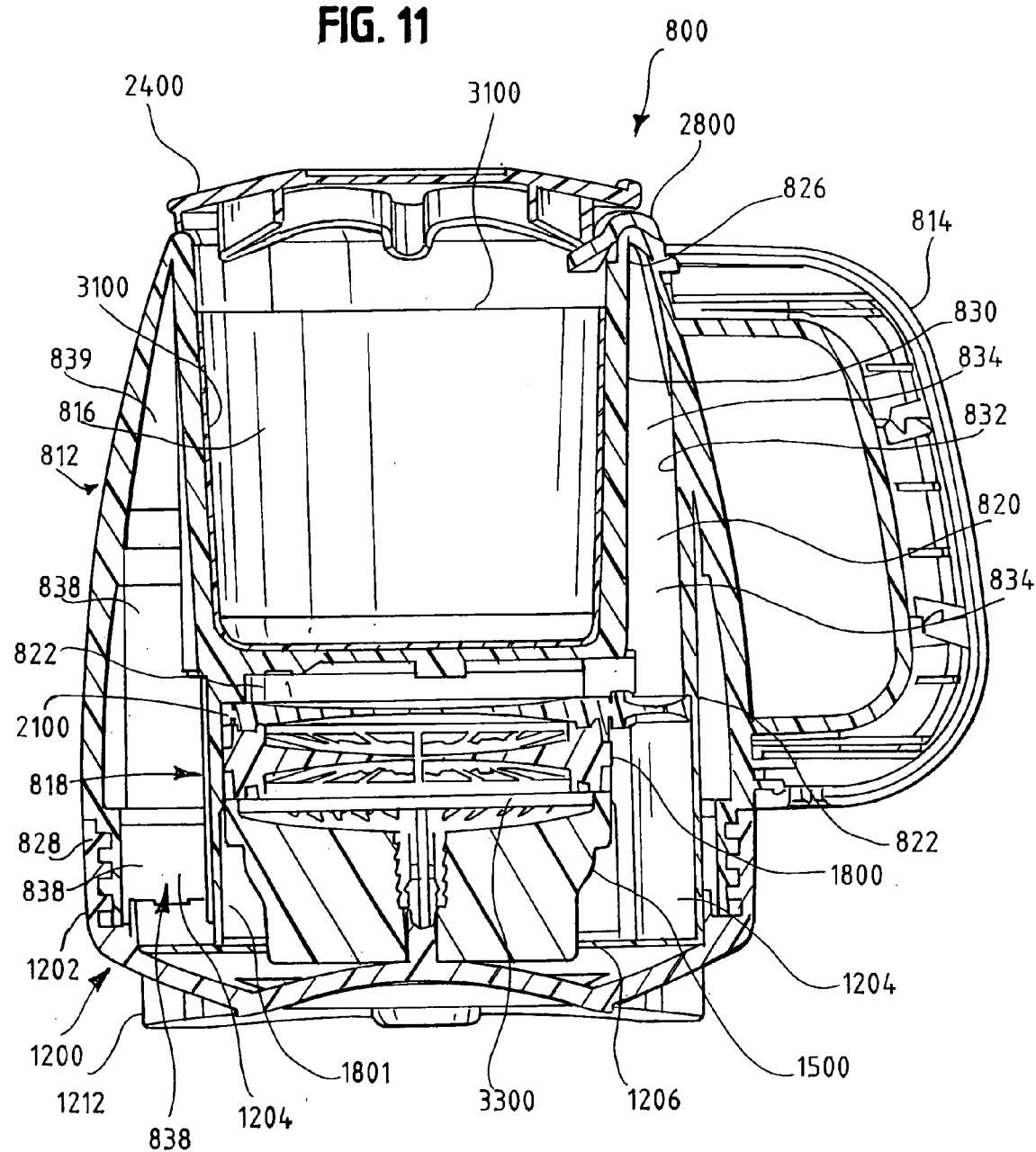

MICROWAVABLE BEVERAGE MAKER

CROSS-REFERENCE TO RELATED APPLICATIONS

This application is related to, and claims benefit of and priority from, Provisional Application No. 60/554,877 dated Mar. 19, 2004, titled "Microwaveable Beverage Maker", the complete subject matter of which is incorporated herein by reference in its entirety.

This patent application describes inventions which are improvements over devices and processes disclosed in commonly assigned patent entitled "Microwavable Beverage Maker," Ser. No. 819,353, filed Mar. 18, 1997, U.S. Pat. No. 5,884,551, issued Mar. 23, 1999 and the patent entitled "Device for Making Coffee and Espresso in Microwave Oven," Ser. No. 09/013,559, filed Jan. 26, 1998, U.S. Pat. No. 6,026,733 issued Feb. 22, 2000, which is a continuation of the patent entitled "Device and Process for Making Coffee and Espresso in Microwave Oven," Ser. No. 08/610,840, filed Mar. 5, 1996, U.S. Pat. No. 5,747,782 issued May 5, 1998, which is a continuation of application Ser. No. 08/458,309, filed Jun. 2, 1995, which itself is a continuation of application Ser. No. 08/037,814, filed Mar. 26, 1993, each of which is incorporated herein by reference in their entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

This application relates in general to a device and process for making hot beverages and hot beverages made thereby. Specifically, this application relates to an improved device and process for making coffee and espresso coffee (sometimes called "expresso") beverages or other hot beverages, and more particularly, but not exclusively, to an improved device and process for making coffee, tea, espresso, and the like for individual servings in a microwave oven.

The general method of making espresso is well known. It involves the process or method of forcing hot water or steam through a particulate brewing substance (conventional coffee grounds or extra fine coffee grounds for example). This pressure method for making coffee differs significantly from the common methods for making drip-type or percolation coffees. The espresso may be brewed with a mixture of espresso coffee grounds and cinnamon or other flavored syrups such as almond, orange, hazelnut, chocolate and the like. Espresso generally is a dark full-bodied brew and may also be served as cappucino, caffe latte, caffe Americano, doppio, or macchiato.

Microwave ovens are widely known and used for a variety of heating tasks, including heating water for instant beverages or heating other beverages and foods. Several devices have been proposed for brewing coffee in microwave ovens, described in the related patent and patent applications identified above and incorporated herein by reference.

U.S. Pat. No. 5,281,785, issued Jan. 25, 1994 (Pasbrig), discloses a device for preparing coffee or tea in a microwave oven. The device has a liquid container, a centrally-located coffee container/filter, a drink container, and a handle. The path of the pressurized heated liquid is from the closed liquid container up through the coffee container/filter into the drink container.

U.S. Pat. No. 3,757,670, issued on Sep. 11, 1973 (Laama et al), discloses a two vessel electric coffeemaker wherein water is forced from the lower metal vessel through a centrally-located coffee container to the upper metal vessel so that the percolate is collected in the upper vessel. An electrical heating element integrally constructed in the base of the device.

U.S. Pat. No. 4,498,375, issued on Feb. 12, 1985 (Bedini), discloses an automatic coffeepot in which the pressurized, heated liquid is forced up through a coffee-containing filter in a manner similar to Laama et al. A gas flame or electric heating coil is used to heat the coffeemaker.

U.S. Pat. No. 4,642,443, issued on Feb. 10, 1987 (Jorgensen et al), discloses a coffee brewing appliance for making coffee by the percolation method in a microwave oven. U.S. Pat. No. 5,079,396, issued on Jan. 7, 1992 (Katz et al), also discloses a microwave coffee percolating device. These devices disclose a percolating or drip-type technique for making coffee.

U.S. Pat. No. 4,104,957, issued Aug. 8, 1978 (Freedman et al), discloses a coffee brewing appliance comprising a carafe, a filter that fits in the neck of the carafe, and a water reservoir located over the filter. The water reservoir communicates with the filter by way of a thermally-controlled valve. When water in the water reservoir is heated by microwave radiation, the valve opens, allowing the water to flow into the filter, extracting coffee constituents from coffee grounds in the filter, so that a coffee beverage accumulates in the carafe.

U.S. Pat. No. 4,577,080, issued Mar. 18, 1986 (Grossman), discloses an appliance similar to that of Freedman et al, except that instead of using a thermally-controlled valve to prevent cold water from the water reservoir from contacting coffee grounds in a filter. This device uses a body of non-toxic wax that melts when the water reaches the desired temperature.

U.S. Pat. No. 4,721,835, issued Jan. 26, 1988 (Welker), discloses a device for brewing coffee in a microwave oven. The device comprises a jug having a top configured as a filter. Water and coffee grounds are placed in the jug, and the filter is fitted in the mouth of the jug. After brewing, the coffee may be poured from the jug, while the coffee grounds are retained by the filter.

U.S. Pat. No. 4,386,109, issued May 31, 1983 (Bowen et al), discloses an espresso coffee maker used in a microwave oven. The water is stored in a microwave transparent reservoir which is adjacent to an aluminum pot. The pot and reservoir are coupled in a fixed spatial relationship by a collar. The collar includes a strainer which presses against a layer of coffee grounds, when the collar is secured to the reservoir. The compressed coffee grounds, in combination with the strainer, form a pressure resistant seal over the opening of the reservoir. The water in the reservoir is heated by microwave energy. The pressure rises to a level sufficient to force steam and water in a downward direction through the coffee grounds into the pot, which stores the espresso coffee.

U.S. Pat. No. 4,381,696, issued May 3, 1983 (Koral), discloses a coffee brewing appliance that is generally similar to that disclosed by Freedman et al.

U.S. Pat. No. 4,345,512, issued Aug. 24, 1982 (Moore), discloses a tea infuser for use in a microwave oven. The tea infuser is made of microwave-transparent plastic material rather than metal.

U.S. Pat. No. 5,012,059, issued Apr. 30, 1991 (Boatman), discloses a device for heating water in a microwave oven. In Boatman's device, water is heated in a water reservoir, then forced from the water reservoir through a tube into a heating chamber, where it is further heated prior to draining through a filter filled with coffee grounds.

U.S. Pat. No. 4,990,734, issued Feb. 5, 1991 (Hirsch et al), discloses a method of preparing coffee. In this device a mixture of water and coffee grounds is heated with microwave radiation, whereby a pressure gradient is produced across a filter, forcing filtrate into a vessel.

German No. OS 3,206,803 includes a coffeepot, a filter to receive coffee, and a water container seated one upon the other. The water container is pervious to microwave radiation and the filter is developed so that substantially no liquid can pass through the filter under atmospheric or ambient pressure. The device is placed in a microwave oven where microwave radiation brings the water in the water container to a boil, while the coffee remains screened off. The formation of steam develops such a high pressure in the water container (up to about 3.45 bar) that the water is forced through the filter.

BRIEF SUMMARY OF THE INVENTION

One of the objects of the present invention is to provide a safe and convenient method and device for brewing hot beverages (coffee, tea, espresso coffee, or other hot beverages, as well as other espresso beverages such as cappucino, caffe latte, caffe Americano, doppio or macchiato for example) in a microwave oven.

Another object of the present invention is to provide a compact device for making coffee, tea, espresso beverages, or the like in a microwave oven, from which device one may conveniently drink individually-sized servings.

Still another object of the present invention is to provide a compact device for making coffee, tea, espresso beverages, or the like in a microwave oven and providing for adequate pressure-relief and/or improved pressure dissipation within the device for safety of operation.

Another object of the present invention is to provide a device for making hot beverages (coffee, tea, or espresso beverages for example) in a microwave oven and providing an improvement in the consistency of brewing by providing a filter/pod compartment which promotes constant flow of water and consistent cycle length of brewing regardless of the type of particulate brewing substance used or degree of packing imposed on the particulate brewing substance.

Yet another object of the present invention is to provide a device for making individually-sized servings of heated beverages using microwave energy. The device comprises a bottom cover including a liquid reservoir capable of containing a liquid and a filter/pod compartment rotatably mounted in the bottom cover for holding a particulate brewing substance and for substantially retaining the particulate brewing substance while permitting the passage of liquid and steam. The device further comprises a filtrate reservoir and a gasket. The filter reservoir has a liner mounted therein, where at least the filtrate reservoir is fluidly coupled to at least the liquid reservoir. The gasket is removably coupled to at least the filter/pod compartment, wherein the gasket comprises a brewing valve for metering a flow of the liquid and steam and a pressure regulator valve for relieving sudden pressure surges. Upon application of microwave energy, the liquid and steam located in the liquid reservoir is pressurized and directed through at least the filter/pod compartment to the filtrate reservoir forming the heated beverages.

Still another object of the present invention is to provide a device for making individually-sized servings of heated beverages using microwave energy. The device comprises at least an upper cup assembly, a bottom cover, a filter and a gasket. The upper cup assembly defines at least one filtrate passage and a filtrate reservoir having a liner mounted therein, where at least the filtrate reservoir is fluidly coupled to at least the filtrate passage. The bottom cover includes a liquid reservoir capable of containing a liquid, the liquid reservoir fluidly coupled to the at least one filtrate passage. The filter/pod compartment is rotatably mounted in the bottom cover for holding a particulate brewing substance and for substantially retaining the particulate brewing substance while permitting the passage of liquid and steam. The gasket is removably coupled to at least the filter/pod compartment, the gasket comprising a brewing valve for metering a flow of the liquid and steam and a pressure regulator valve for relieving sudden pressure surge. Upon the application of microwave energy, liquid and steam located in the liquid reservoir is pressurized and directed through at least the filter/pod compartment, through the bottom thereof, to the filtrate reservoir forming the heated beverages.

Yet one other object of the present invention is to provide a method for making individually-sized servings of heated beverages using microwave energy. The method comprises filling at least a portion of a filter/pod compartment with a particulate brewing substance, the filter/pod compartment adapted to hold the particulate brewing substance while permitting passage of liquid and steam. The filter/pod compartment is placed within a water reservoir in a bottom cover, the water reservoir fluidly coupled with at least a filtrate reservoir having an integral liner. A gasket is engaged to at least the filter/pod compartment, the gasket comprising a brewing valve for metering a flow of the liquid and a pressure regulator valve for relieving sudden pressure surges. The bottom cover is engaged to the water reservoir. Microwave energy is applied to at least the combined water reservoir and bottom cover, filter/pod compartment and gasket such that the liquid is pressurized forming steam, both the pressured liquid and steam being forced through at least the filter/pod compartment containing the particulate brewing (coffee or tea for example) and into the filtrate reservoir thereby brewing the heated beverage.

The present invention thus provides a simple, safe, inexpensive, and convenient means for brewing coffee, tea, and espresso beverages in the microwave oven. It further provides a compact device useable as a drinking cup for individual-sized servings. Other objects, advantages, and novel features of the present invention will become apparent from the following description and drawing.

BRIEF DESCRIPTION OF SEVERAL VIEWS OF THE DRAWINGS

FIG. 3 is a plan view of one embodiment of a filter used with the microwave beverage maker similar to that of FIG. 1.

FIG. 4 is a plan view of one embodiment of a gasket used in a microwave beverage maker similar to that of FIG. 1.

FIG. 5 is a side elevational view of one embodiment of the gasket similar to that of FIG. 4.

FIG. 6 is an enlarged partial view of an edge of one embodiment of the gasket similar to that of FIG. 4.

FIG. 7 is a partial view of the bypass valve of the gasket similar to that of FIG. 4.

FIG. 8 is a perspective view of another embodiment of a microwaveable beverage maker depicted without a filtrate splash cover.

FIG. 9 is a top plan view of a microwaveable beverage maker similar to that of FIG. 8 depicted without a filtrate splash cover.

FIG. 10 is a bottom plan view of a microwaveable beverage maker similar to that of FIG. 8.

FIG. 11 is an elevational cross-sectional view of a microwaveable beverage maker of FIG. 9 taken along line 11—11 and depicted with a filtrate splash cover.

Figure 1:
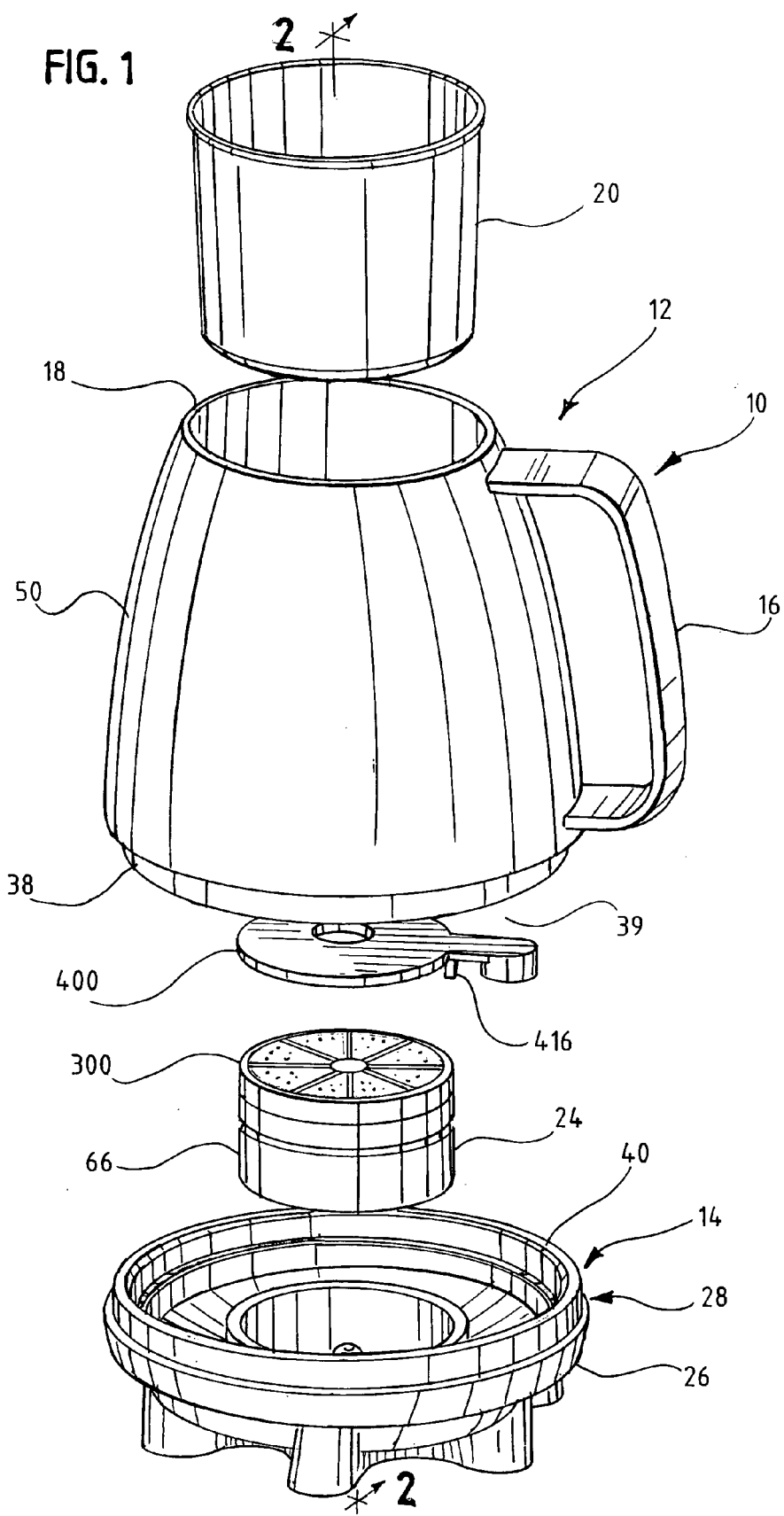
FIG. 1 is an exploded perspective view of one embodiment of a microwave beverage maker.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF THE INVENTION

Referring to FIG. 1 there is generally shown an embodiment of a microwave beverage maker 10. The beverage maker 10 generally includes an upper cup assembly 12, a bottom assembly 14, and a handle 16. It is contemplated that the beverage maker 10 may include a filtrate splash cover (not shown). In at least one embodiment, the beverage maker 10 may be generally constructed of a plastic microwave-transparent, pressure-resistant material suitable (for example, polypropylene, PET® polyethylene terephthalate, polyester, ULTEM® polyether imide, polysulphane, or ULTEM® LTX Series polyether imide-polycarbonate blend) for contact with beverages. By microwave-transparent, it is meant that microwave energy will pass through the material without substantial loss of energy.

In at least one embodiment of beverage maker 10, the upper cup assembly 12 includes a generally cup-like filtrate reservoir 18 which is adapted to receive a cup or liner 20 (a thin aluminum cup which is molded in place for example) having first or upper reservoir 39. In one embodiment, liner 20 shields any beverage contained therein from microwave energy, preventing the beverage from being overheated.

FIG. 1 further illustrates bottom assembly 14 which, in one embodiment, comprises gasket valve or gasket 400, filter/pod compartment 24 and bottom cover 26 having second or lower liquid or water reservoir 28. Bottom cover 26 includes a receptacle 30 (best viewed in FIG. 2) for receiving filter/pod compartment 24; the filter/pod compartment 24 holding coffee grounds, tea, espresso or other particulate brewing substance. The general shape of the components as well as whether the components are integrally molded together or are multiple affixed pieces are matters of design choice.

Figure 2:
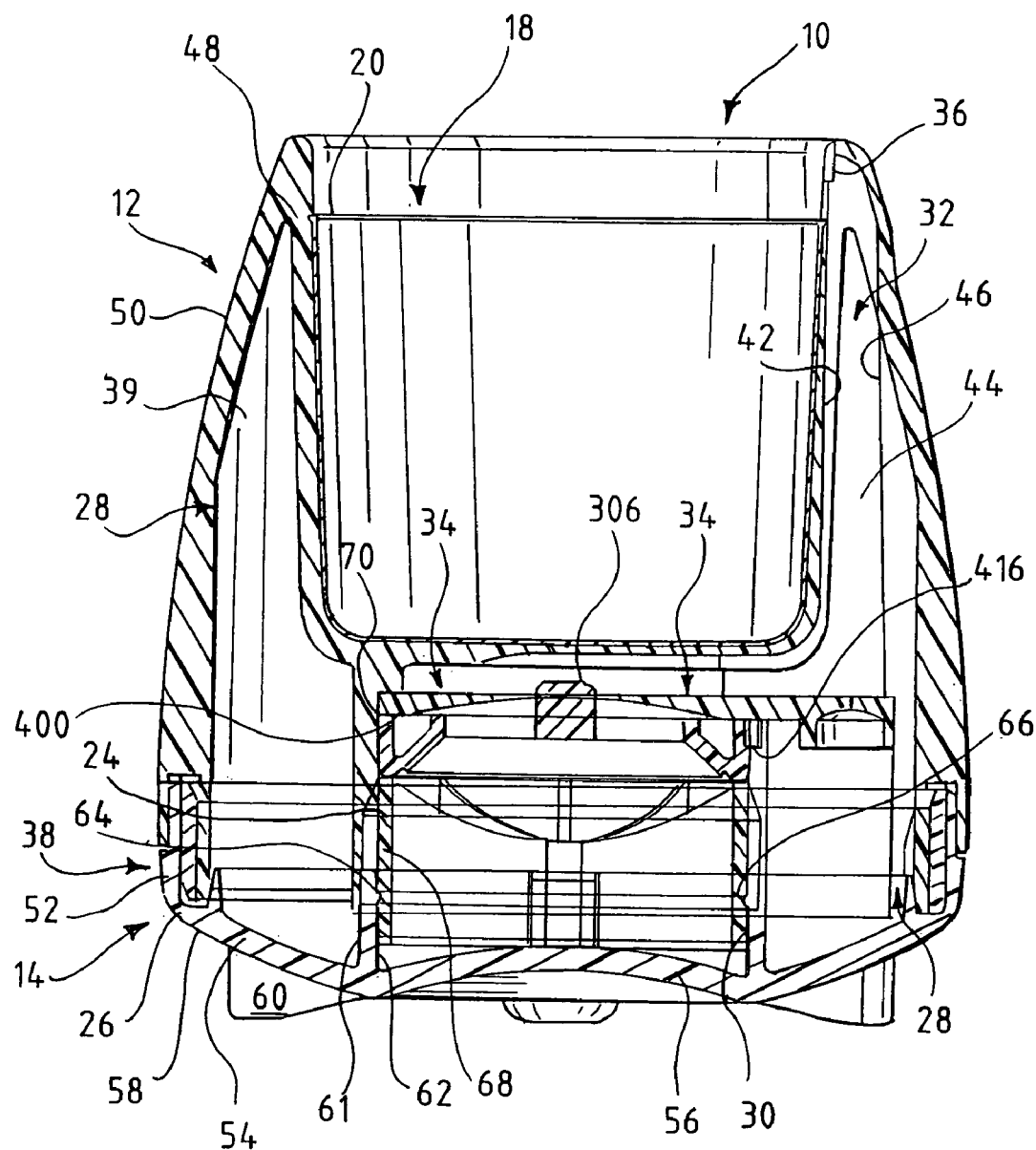
FIG. 2 is an elevational cross-sectional view of one embodiment of a microwave beverage maker similar to that of FIG. 1.

FIG. 2 illustrates the bottom cover 26 of beverage maker 10 including receptacle 30 positioned centrally in lower reservoir 40, where receptacle 30 is adapted to removably receive the filter/pod compartment 24. Furthermore, in at least one embodiment, upper cup assembly 12 defines at least one filtrate passage 32 having at least one opening, for fluidly conducting steam and water from at least the filter/pod compartment 24 to at least the filtrate reservoir 18. In at least one embodiment, filtrate passage 32 is formed by passage interior surface 42, passage side walls 44, and passage back wall 46 integrally molded within a portion of the upper cup assembly 12. In the illustrated embodiment, upper cup assembly 12 defines the at least one filtrate passage 32 having two openings, first and second openings 34 and 36.

The bottom cover 26 including lower water reservoir 40 releasably engages the upper cup assembly 12 and upper reservoir 39 at connection 38. It should be appreciated that any known releasable attachment mechanism is contemplated. Such engagement engages the removable filter/pod compartment 24 and gasket 400 between the reservoir 28 and upper cup assembly 12, such that the first opening 34 of the filtrate passage 32 fluidly engages at least an upper portion of gasket 400, enabling fluid to pass from the reservoir 28 (into lower and upper reservoirs 40 and 39 for example) in a direction up through the filter/pod compartment 24 into at least the filtrate reservoir 18.

To operate, ground coffee, tea, or other espresso particulate brewing substance, either loose, in a porous block form, contained in a paper bag or other filter, or in a filtrate pod as provided below, is placed within the filter/pod compartment 24. The upper filter is reconnected or attached to the upper edges of filter/pod compartment 24. The filter/pod compartment 24 is placed within the receptacle 30 of the reservoir 28 such that the filter/pod compartment 24 is located generally in the flow path between the filtrate passage 32 and reservoir 28. A suitable quantity of water is poured into the reservoir 28, and the annular end of the circular bottom cover 26 is removably connected to the upper cup assembly 12 at connection 38. The gasket 400 forms a substantial seal or seat between the filtrate passage 32 and the filter/pod compartment 24, where, in at least one embodiment, the gasket 400 substantially closes the path for passage of liquid and steam from the filter/pod compartment 24 to the filtrate passage 32.

Upon application of the microwave energy, the liquid (water for example) in the reservoir 28 heats up, forms steam, and increases pressure in reservoir 28 (at an upper portion of upper reservoir 39 for example). When the pressure within the filter/pod compartment 24 reaches a predetermined level (approximately 5 psi for example), the steam pressure in the reservoir 28 opens gasket 400, deflecting the gasket (the central area for example) upward or away from the upper filter, thus opening the central area or passage normal kept closed by central mounting post 306. The steam pressure further forces hot liquid and steam to rise upwards through the filter/pod compartment 24, the particulate brewing substance, the filtrate passage 32 and into the filtrate reservoir 18. In at least one embodiment a filtrate splash cover (not shown) is removably connected to an upper portion of upper cup assembly 12. The cover serves to break up bubbles and deflect liquid into the filtrate reservoir 18 and to contain steam within the filtrate reservoir, where it may cool and condense. The cover thereby limits the undesired escape of fluid and steam into the microwave oven. The process continues until most of the water has been discharged into the filtrate reservoir 18. Espresso may be brewed in approximately two to three minutes, depending upon the power of the oven, the quantity of espresso being brewed, and the atmosphere conditions.

As illustrated, filtrate reservoir 18 is generally cylindrical and formed by wall 48. Handle 16 is illustrated integrally connected to an outer surface 50 of upper cup assembly 12. Reservoir 28 is formed by wall 52, downwardly, inwardly sloping wall 54 and bottom wall 56 which are integrally connected together. Opening 36 is formed in wall 48 at a location generally aligned with an upper portion of the handle 16. Bottom cover 26 may have a convex outer surface 58 and/or one or more fins 60 to improve stability of the beverage maker 10 when placed on a surface.

In one embodiment the receptacle 30 includes inner receptacle surface 62 and outer receptacle surface 61, forming a pocket for removably receiving the filter/pod compartment 24. The receptacle 30 may utilize any alternative configuration or structure to hold or align the filter/pod compartment 24 in place. As illustrated, inner surface 62 forms a lip 64 that removably engages a detent 66 formed in the filter/pod compartment 24.

FIGS. 1 and 2 depict the filter/pod compartment 24 as generally cylindrical, although other configurations are suitable, and includes one or more filters (lower and upper filters for example). In at least one embodiment, filter/pod compartment 24 has an inside diameter which is generally constant. The compartment 24 may be fixed or self-contained and removable. The cylindrical filter/pod compartment 24 has a cylindrical wall 68 that defines detent 66. An upper annular ledge 70 is formed at the top of cylindrical wall 68 of the filter/pod compartment 24.

FIG. 3 depicts an embodiment of a filter 300 (an upper filter for example) that removably sits on upper ledge 70 during operation. Filter 300 comprises support ribs 302 extending from support post 306 in a spaced radial direction on either the upper or lower sides of the filter 300 or both and an outer support ring 304. One or more recessed surfaces 308 are located within a substantial portion of the areas defined by the support ribs 302 and support ring 304. In at least one embodiment, filter 300 has an outside diameter which is substantially the same as the outside diameter of the upper portion of the filter/pod compartment 24. In one embodiment, filter 300 is threadably mounted to the filter/pod compartment 24, although a pin, hinge or other suitable mechanisms or structures are contemplated.

FIG. 3 further illustrates that the filter 300 has a plurality of openings or perforations 310 of a size and number sufficient to retain the particulate brewing substance, while allowing passage of steam and water. The size of the openings may range from 0.020 to 0.040 inches in diameter; although other sizes may be suitable depending on the size of the particulate brewing substance. Further, the openings may range from 100 to 150 in number. In one embodiment, there are 124 openings 310 having an equal combination of openings 0.032 inches and 0.040 inches in diameter. A central upper mounting post 306 is illustrated defined by the central upstanding portion of upper filter 300 and sized to fit within an opening of gasket 400.

In one embodiment, a lower filter (not shown) is contemplated coupled to the lower portion of the filter/pod compartment 24. It is contemplated that the lower filter may be similar to that depicted in FIG. 3 or different therefrom. The lower may be removably connected to or integrally formed in the filter/pod compartment 24.

Referring now to FIGS. 4–7, one embodiment of gasket or valve 400 is illustrated. The gasket or valve 400 is made of any suitable resilient material (food grade silicon rubber for example) and adapted to fit within a space of the bottom cover 28 between a top surface of filter 300 and the lower surface of upper cup assembly 12. A gasket having a hardness of approximately 60 durometer, was found to provide pressure relief at approximately 5–6 psi. Other gasket hardnesses or pressure relief settings are appropriate depending on the circumstances and design considerations.

In this embodiment, gasket 400 comprises at least two portions or compartments, generally circular first compartment or brewing valve portion 402 and second compartment or pressure regulator/safety valve 404. In at least one embodiment, brewing valve portion 402 controls the flow of the brewed liquid.

In the illustrated embodiment, generally circular brewing valve portion 402 has a surface 406 and outer rim 408 defining slit 409 (best viewed in FIG. 6). Surface 406 defines two stages or openings that open in sequence. The first or primary opening 410 (centrally located in brewing valve portion 402 and adapted to removably receive upper mounting post 306) meters the flow of the brewed liquid, slowing down the liquid flow. Slowing down the liquid flow enables the liquid to more completely extract the flavor from the particulate brewing substance (coffee for example). Opening 410 is normally in a closed position, but opens upon sufficient pressure build up. During the normal brewing process, the portion of the gasket 400 near the upper mounting post 306 deflects upward when the pressure within the filter/pod compartment 24 reaches a sufficient level (about four or five psi). This enables the pressurized fluid and steam to flow from the filter/pod compartment 24 into the filtrate passage 32.

The second or secondary opening 412 is, in one embodiment, placed proximate to first opening 410. In one embodiment, the second opening 412 is offset from the first opening 410 in the center of gasket 400 and comprises one or more slits 414. In at least one embodiment, slits 414 open under pressure to relive sudden surges due to, for example, a concentration of microwave energy or a shift in the filtrate medium. Secondary opening 412 prevents the chocking of the first opening 410 due to a sudden pressure build-up.

The second compartment or pressure regulator/safety valve portion 404 comprises a pressure regulator. In one embodiment, the pressure regulator/safety valve portion 404 comprises an elongated portion 415 having a tab 416 (best viewed in FIG. 1) and pressure regulator/safety/bypass valve 418 (best viewed in FIG. 7). In at least one embodiment, tab 416 provides support to rubber elongated portion 415, making portion 415 rigid so it will not collapse under pressure and compromise the seal.

In at least one embodiment, the pressure regulator/safety/bypass valve 418 comprises one or more slits 420 and acts a safety valve. In at least one embodiment, the one or more slits 420 are normally in a closed position but open under pressure to relieve sudden surges due to, for example, a concentration of microwave energy, a shift in the filtrate medium or a blockage in the normal water/steam passage. The pressure regulator/safety/bypass valve 418 is, in one embodiment, placed directly over the reservoir 28 and fluidly communicates with at least filtrate passage 32, acting as a bypass route in case the particulate brewing substance offers too much resistance to the flow of liquid under pressure (if the filter medium, coffee for example, is ground too fine).

It is contemplated that, as a pressure regulator, the pressure regulator/safety/bypass valve 418 determines the maximum pressure allowed in the water reservoir 28. Changing the controlled pressure (modifying the slit pattern of the pressure regulator/safety/bypass valve 418 for example), modifies the extraction strength of the brewed liquid and determines the flavor of hot beverage.

Referring now to FIGS. 8, 9 and 10, there is generally shown another embodiment of a microwave beverage maker, designated 800. Beverage maker 800 generally includes an upper cup assembly 812, a bottom assembly 1200, a handle 814 and liquid or water reservoir 838. It is contemplated that beverage maker 800 further includes a filtrate splash cover 2400 and deflector 2800 (see FIG. 11 for example). In at least one embodiment, the beverage maker 800 may again be generally constructed of a plastic microwave-transparent, pressure-resistant, dishwasher safe material (for example, polypropylene, PET® polyethylene terephthalate, polyester, ULTEM® polyether imide, polysulphane, or ULTEM® LTX Series polyether imide-polycarbonate blend) suitable for use with both hot and cold beverages and both microwave and dishwasher safe.

In at least one embodiment, the upper cup assembly 812 includes a generally cup-like filtrate reservoir 816 which is adapted to receive a liner or shield 3100 (a thin cup comprised of aluminum or other suitable microwave reflective material for example) and a first or upper water or liquid reservoir 839. Liner 3100 (best viewed in FIGS. 11, 31 and 32) is generally locked in place and shields any beverage contained therein from microwave energy, preventing the beverage from being overheated.

FIG. 11 further illustrates bottom assembly 1200 which, in one embodiment, comprises gasket valve or gasket 2100, filter/pod compartment 818 and bottom cover 1202 forming second or lower liquid or water reservoir 1204. Bottom cover 1202 includes a receptacle 1206 and pin 1208 (best viewed in FIG. 12) for receiving a filter/pod compartment 818; where filter/pod compartment 818 is adapted to hold coffee grounds, tea, espresso or other particulate brewing substance either free or in a pod as provided below. The general shape of the components, as well as whether the components are integrally molded together or are multiple affixed pieces, are matters of design choice. Bottom cover 1202 may have a convex outer surface 1210 and/or one or more fins 1212 to improve stability of the beverage maker 800 when placed on a surface. In one embodiment, outer surface 1210 may include a star-shaped rib (not shown) used to improve stability.

Figure 12:
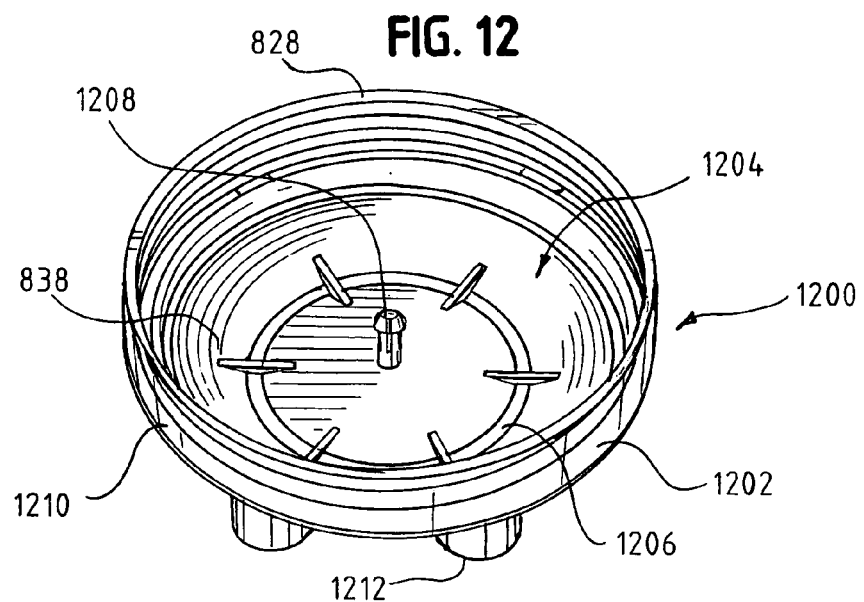
FIG. 12 is a top perspective view of a bottom cover of a microwaveable beverage maker similar to that of FIG. 8.
Figure 13:
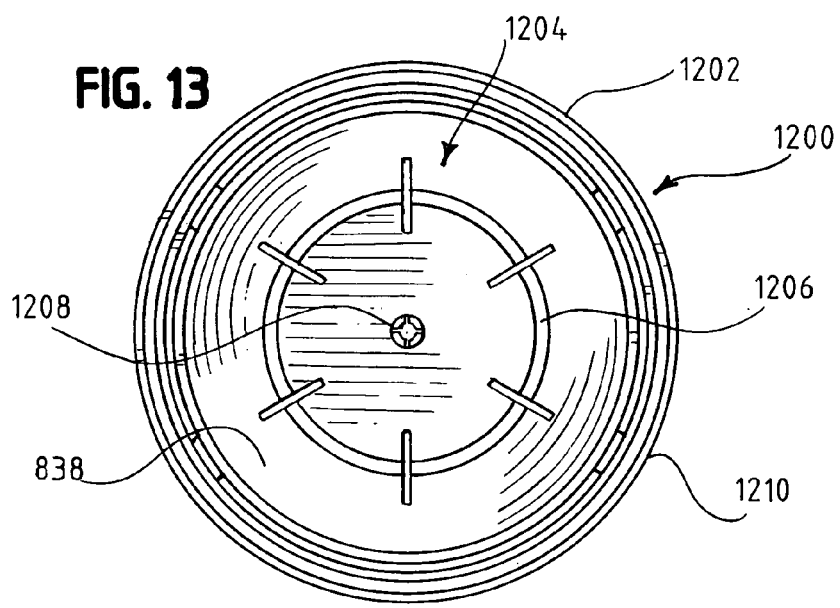
FIG. 13 is a top plan view of the bottom cover similar to that of FIG. 12.
Figure 14:
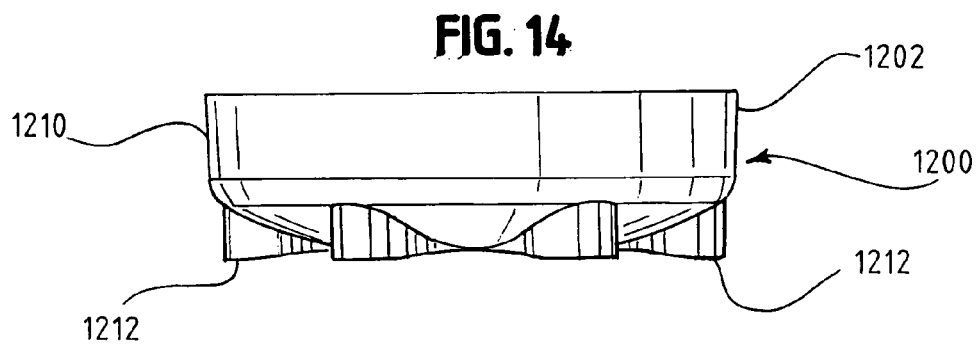
FIG. 14 is a side elevational view of the bottom cover similar to that of FIG. 12

FIGS. 12, 13 and 14 illustrate an embodiment of bottom cover 1202 including receptacle 1206 positioned (centrally for example) in reservoir 1204, where receptacle 1206 is adapted to receive the filter/pod compartment 818 first or lower pod holder 1500 for example). In at least one embodiment, receptacle 1206 is adapted to receive the filter/pod compartment 818, or at least a portion thereof, in a removable manner, a rotatable manner or both. Reservoir 838 (upper and/or lower reservoirs 839 and 1204) may include one or more marks (high gauge marks for example not shown) used in indicating the water levels needed in making different heated beverages (coffee, espresso and double espresso for example).

Furthermore, in at least one embodiment, upper cup assembly 812 defines at least one filtrate passage 820 having at least one opening, for fluidly conducting steam and liquid (water for example) from at least the filter/pod compartment 818 to at least the filtrate reservoir 816 (best viewed in FIG. 11). Filtrate passage 820 is formed by passage interior surface 830, passage side walls 832, and passage back wall 834 integrally molded within a portion of the upper cup assembly 812. In the illustrated embodiment, upper cup assembly 812 defines the at least one filtrate passage 820 having two openings, first and second openings 822 and 826, where first opening 822 fluidly communicates with water reservoir 838 (lower reservoir 1204 for example) while second opening 826 fluidly communicates with at least filtrate reservoir 816.

The bottom cover 1202 including second or lower reservoir 1204 releasably engages the upper cup assembly 812 at connection 828. It should be appreciated that any known releasable attachment mechanism is contemplated (reciprocal square threads are depicted). Such releasable engagement removably positions the filter/pod compartment 818 and gasket 2100 between the reservoir 1204 and upper cup assembly 812, such that the first opening 822 of the filtrate passage 820 fluidly engages at least an upper portion of gasket 2100, enabling steam or liquid (water for example) to pass from the water reservoir 838 (upper and/or lower reservoirs 839 and 1204 for example) through the filter/pod compartment 818 (entering through the bottom thereof) into at least the filtrate reservoir 816.

It should further be appreciated that, while bottom cover 1202 and receptacle 1206 are illustrated, any alternative configuration or structure to hold or align the filter/pod compartment 818 in place are contemplated. FIGS. 15–20 depict an embodiment of a filter/pod compartment 818. The filter/pod compartment 818 may be fixed or self-contained and removable. At least one embodiment comprises first or lower and second or upper pod holders 1500 and 1800, however other embodiments comprise first and second pod holders 1500 and 1800 and filter shield 3300 (best viewed in FIGS. 33–36), wherein at least one of the first or lower pod holder 1500, second or upper pod holder 1800 and the filter shield 3300 may be removed from the bottom assembly 1200.

Figure 15:
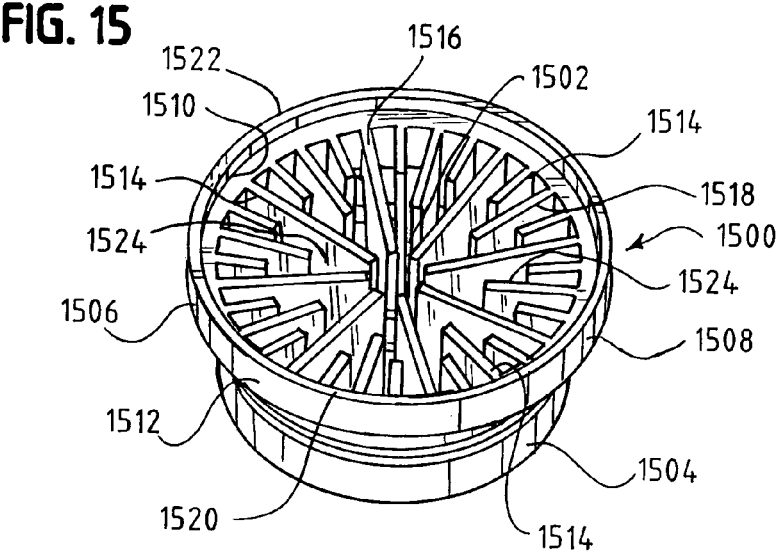
FIG. 15 is a top perspective view of a first or lower pod holder of a microwaveable beverage maker similar to that of FIG. 8.
Figure 16:
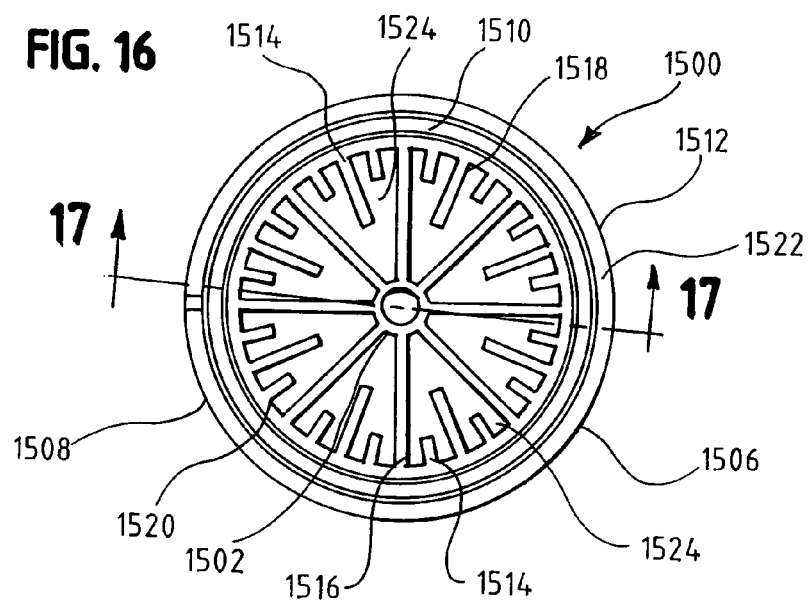
FIG. 16 is a top plan view of the first or lower pod holder similar to that of FIG. 15.
Figure 17:
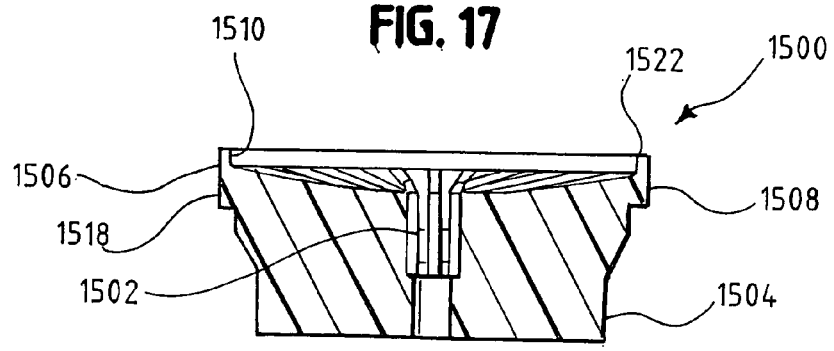
FIG. 17 is an elevational cross-sectional view of the first or lower pod holder of FIG. 16 taken along line 17—17.

In the illustrated embodiment, filter/pod compartment 818, comprising first or lower and second or upper pod holders 1500 and 1800 respectively, sits in receptacle 1206 in a removable and/or rotatable manner using centrally located, downwardly extending pin receptacle 1502 adapted to receive pin 1208. Pin 1208 is received by pin receptacle 1502 in a removable and/or rotatable manner, where pin receptacle 1502 has an inner diameter approximately equal or slightly greater than the outer diameter of pin 1208, enabling the first or lower pod holder 1500 to rotate in receptacle 1206. Referring to FIGS. 15–17, the first or lower pod holder 1500 has a generally conical appearance (best view in FIG. 17), wherein lower portion 1504 of the first or lower pod holder has an inside diameter smaller than an inside diameter of upper portion 1506. It should be appreciated that, although a generally conical first or lower pod holder 1500 is depicted, other shapes are contemplated.

In at least one embodiment, first or lower pod holder 1500 comprises a filter wall 1508 having inner and outer surfaces 1510 and 1512. At least one, but generally a plurality of support ribs 1514 are coupled to and extend from inner surface 1510 towards pin receptacle 1502 in a spaced radial relationship. At least one of the plurality of support ribs 1514 (a first set of support ribs 1516 for example) is coupled to both inner surface 1510 and pin receptacle 1502 and extends there between, while one other of the plurality of support ribs 1514 (a second and/or third set of support ribs 1518 and 1520 for example) is coupled to the inner surface 1510 and extends only partway towards the pin receptacle 1502. Filter wall 1508 defines an annular ring or edge 1522 at one end thereof (proximate upper portion 1506 for example). This annular ring or edge 1522 interlocks with the second or upper pod holder 1800.

The first or lower pod holder 1500 defines one or more sections 1524. In at least one embodiment, at least one of the sections 1524 are defined by at least one or more support ribs 1514, pin receptacle 1502 and inner surface 1510. The sections 1524 are in fluid communication with at least the lower reservoir 1204 and are adapted to receive liquid placed therein. It is contemplated that, after application of microwave energy (i.e., completion of the brew cycle) liquid or water may remain in the liquid or water reservoir, which is to be minimized. Support ribs 1514, alone or in some combination with pin receptacle 1502 and/or inner surface 1510, limit the amount of space in the first or lower pod holder 1500 available for the liquid or water, decreasing the amount of water in transition. In this manner, much less liquid is left behind in the filter/pod compartment 818 during the application of microwave energy (i.e., the brewing process), so that only a small amount of liquid remains in the water reservoir 1204.

It should further be appreciated that the beverage maker 800 may accept pods of different sizes containing filtrate as provided below. Therefore, the filter/pod compartment 818 should be able to accommodate pods of different sizes without shredding the pod filter or membrane and, at the same time, preventing the liquid from going around the pod (i.e., all or almost all of the liquid should flow through the filter/pod compartment 818 and pod).

Figure 18:
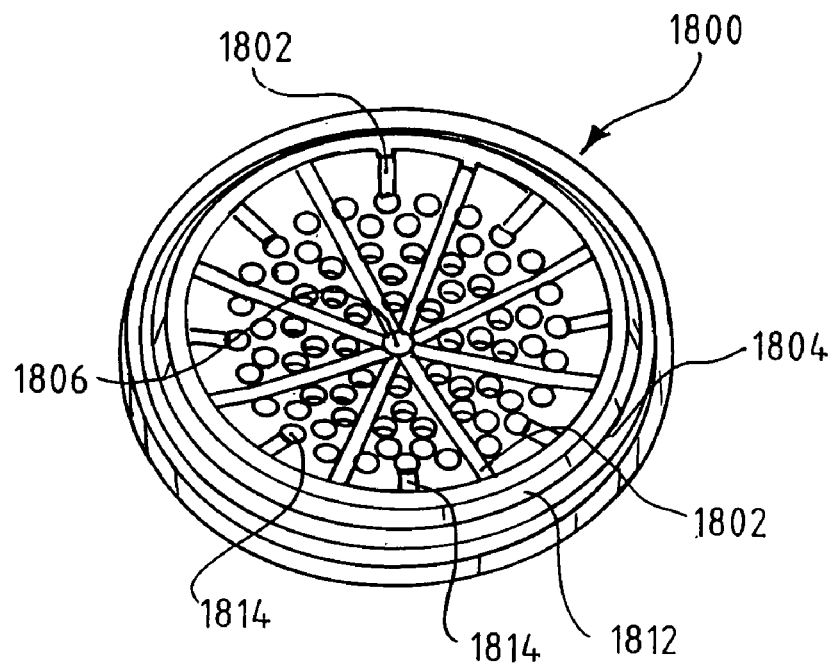
FIG. 18 is a perspective view of a second or upper pod holder of a microwaveable beverage maker similar to that of FIG. 8.
Figure 19:
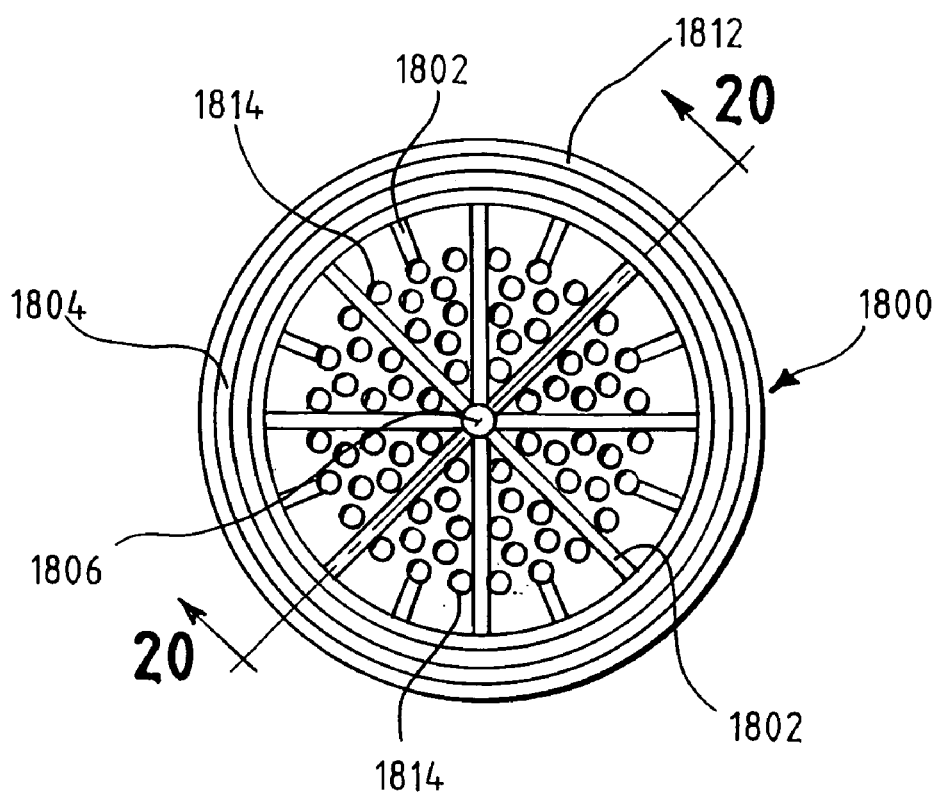
FIG. 19 is a plan view of the second or upper pod holder similar to that of FIG. 17 wherein the bottom view is a mirror image thereof.
Figure 20:
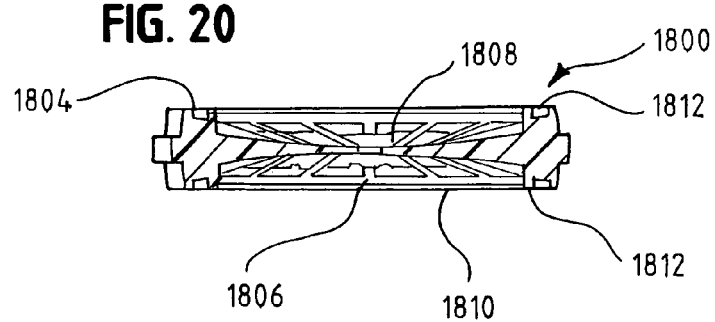
FIG. 20 is an elevational cross-sectional view of the second or upper pod holder of FIG. 19 taken along line 20—20.

FIGS. 18–20 depict second or upper pod holder 1800 that removably positioned in pod guide or guide wall 1801 (illustrated in FIG. 11) and sits on or engages the first or lower pod holder 1500 during the brewing process. Second or upper pod holder 1800 comprises first and second surfaces 1808 and 1810 respectively (first and second recessed or concave surfaces for example), where second surface 1810 is a mirror image of first surface 1808, such that either surface may engage the first or lower pod holder 1500 and the gasket 2100 during the assembly and brewing process.

In at least one embodiment, second or upper pod holder 1800 comprises one or more support ribs 1802 extending between (or partway between) support post 1806 and one or more outer support rings 1804 in a spaced radial relationship. Outer support rings 1804 define at least one annular ring 1812 on both sides thereof. Support ring 1804 engages and interlocks with at least the first or lower pod holder 1500 (engaging annular ring 1522 for example), enabling the second or upper pod holder 1500 to seal. As provided previously, the beverage maker 800 accommodates pods of different sizes, and in order to work with both large and small sized pods, the upper pod holder 1800 uses annular ring 1812 that engages the different sized pods at a critical diameter so that liquid doesn't bypass the different sized pod, but goes through the pod. As provided previously, the lower pod holder 1800 is rotatable about pin 1208, so that the when the lower holder 1800 engages the upper pod holder 1500, bottom cover 1202 can rotate (to engage the threads at connection 828 for example) without shredding the differing sized pods.

FIGS. 18 and 19 further illustrate that the second or upper pod holder 1800 defines a plurality of openings or perforations 1814 of a size and number sufficient to retain the particulate brewing substance, while allowing the passage of steam and liquid.

Figure 21:
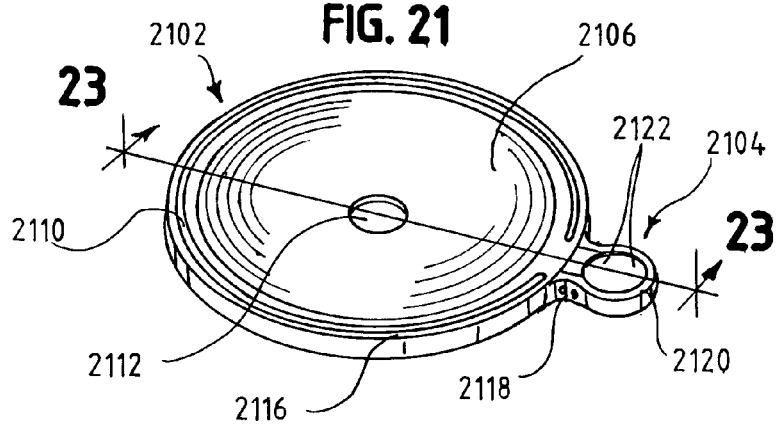
FIG. 21 is a top perspective view of a gasket of a microwaveable beverage maker similar to that of FIG. 8.
Figure 22:
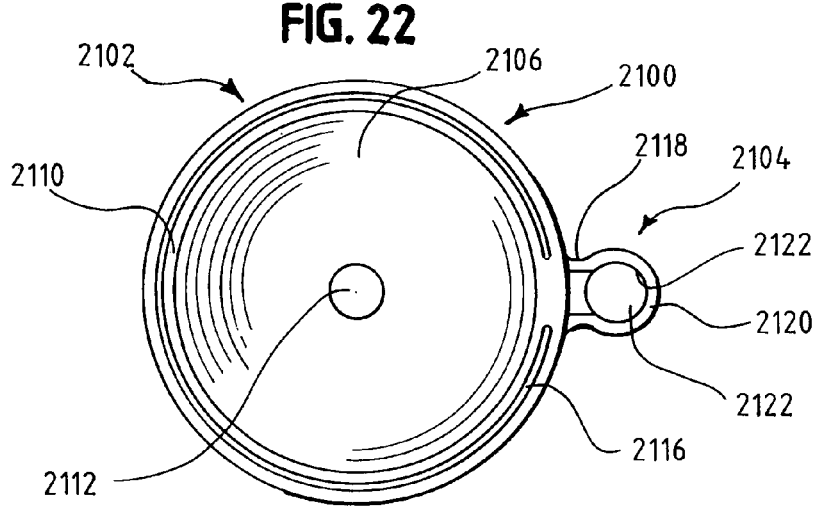
FIG. 22 is a plan view of the gasket filter similar to that of FIG. 21 wherein the bottom view is a mirror image thereof.
Figure 23:
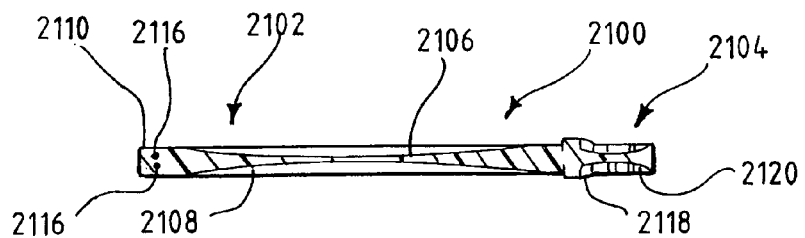
FIG. 23 is an elevational cross-sectional view of the gasket of FIG. 21 taken along line 23—23.

Referring now to FIGS. 21–23, one embodiment of gasket or valve 2100 is illustrated. The gasket or valve 2100 is made of any suitable resilient material transparent to microwave energy (food grade silicon rubber for example) and is adapted to removably fit within predetermined space in the beverage maker 800 (between a top surface of second or upper pod holder 1800 and the lower surface of upper cup assembly 812 for example). In at least one embodiment, gasket 2100 comprises material having a hardness of approximately 60 durometer. Other material hardness or pressure relief settings are appropriate depending on the circumstances and design considerations.

In this embodiment, gasket valve 2100 comprises at least two portions or compartments, generally circular first or brewing valve portion 2102 and second compartment or pressure regulator/safety valve 2104 (best viewed in FIGS. 21 and 22). In at least one embodiment, gasket 2100 is adaptable, controlling the flow of the brewed liquid and/or regulates pressure, preventing accidents.

In the illustrated embodiment, generally circular brewing valve portions 2102 has first and second surfaces 2106 and 2108 (recessed or concave surfaces for example), where second surface 2108 is a mirror image of first surface 2106, and outer rim 2110. Surfaces 2106 and 2108 define at least one stage or opening 2112 (centrally located in brewing valve portion 2102 for example) that acts as a meter valve, metering the flow of the brewed liquid, slowing down the liquid flow as it passes through at least the particulate brewing substance. Slowing down the liquid flow enables the liquid to more completely extract the flavor from the particulate brewing substance (coffee or tea for example). During the normal brewing process, the portion of the gasket 2100 deflects upward when the pressure within the filter/pod compartment 818 reaches a predetermined level (four or five psi for example). This enables the pressurized fluid and steam to flow from the filter/pod compartment 818 into the filtrate passage 820, through the bottom of the lower pod holder 1500.

In at least one embodiment, gasket 2100 includes a slit 2116 defined in outer rim 2110. In one embodiment slit 2116, is adapted to engage an outside surface and/or annular ring 1812 of the second or upper pod holder 1800, confining movement of the brewing valve portion 2102, producing a seal.

The second or pressure regulator/safety valve 2104 comprises a pressure regulator. In one embodiment, the pressure regulator/safety valve 2104 comprises an elongated portion having a tab 2118 (best viewed in FIGS. 21 and 23) and bypass valve 2120 (best viewed in FIG. 21). Tab 2118 engages a ledge of the filter/pod compartment 818 and acts to confine movement of the brewing valve portion 2102.

In at least one embodiment, the pressure regulator/safety valve 2104 comprises one or more slits 2122 and acts a safety or over pressure valve. The one or more slits 2122 are normally in a closed position but open under pressure to relieve sudden surges due to, for example, a concentration of microwave energy or a blockage of the regular passage through the coffee pod (i.e., the pressure regulator/safety valve 2104 adapts to the pressure change). The pressure regulator/safety valve 2104 is, in one embodiment, placed directly over the reservoir 1204 and fluidly communicates with at least filtrate passage 820 and is adaptable, acting as a bypass route in case the particulate brewing substance offers too much resistance to the flow of liquid under pressure (if the filter medium, coffee for example, is ground too fine).

It is contemplated that, as a pressure regulator, the pressure regulator/safety valve 2104 determines the maximum pressure allowed in the water reservoir 1204. Changing the controlled pressure (modifying the slit pattern of the pressure regulator/safety valve 2104 for example), modifies the extraction strength of the brewed liquid and determines the flavor of hot beverage.

Figure 24:
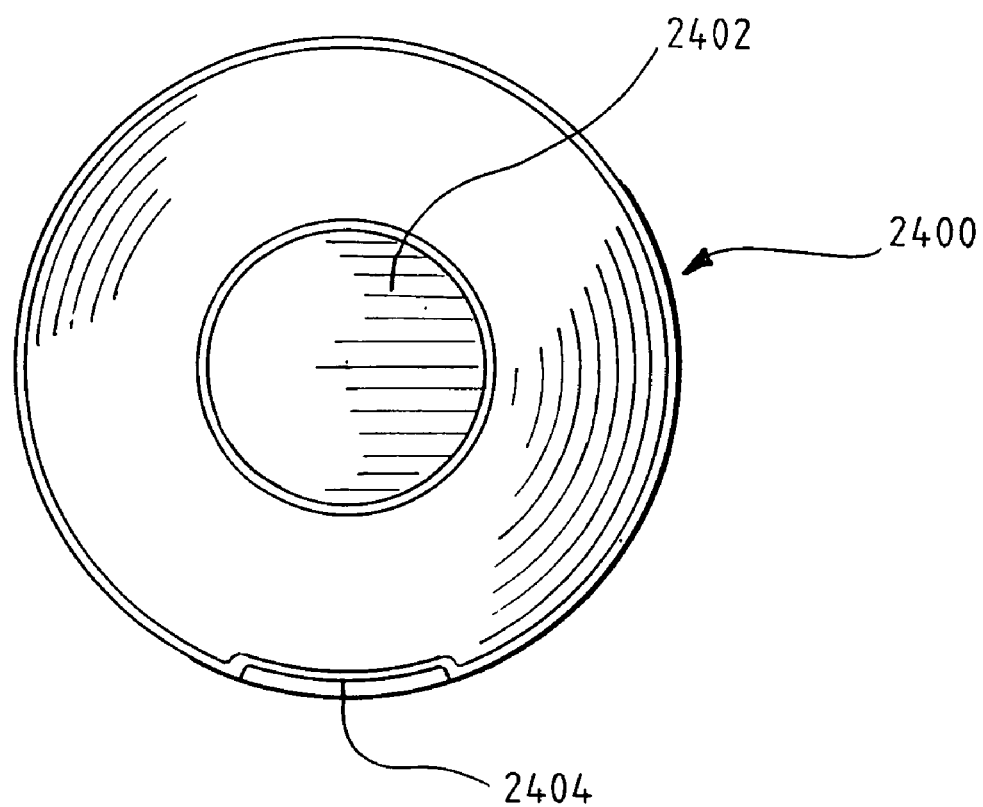
FIG. 24 is a top plan view of the filtrate splash cover used with a microwaveable beverage maker similar to that of FIG. 8.
Figure 25:
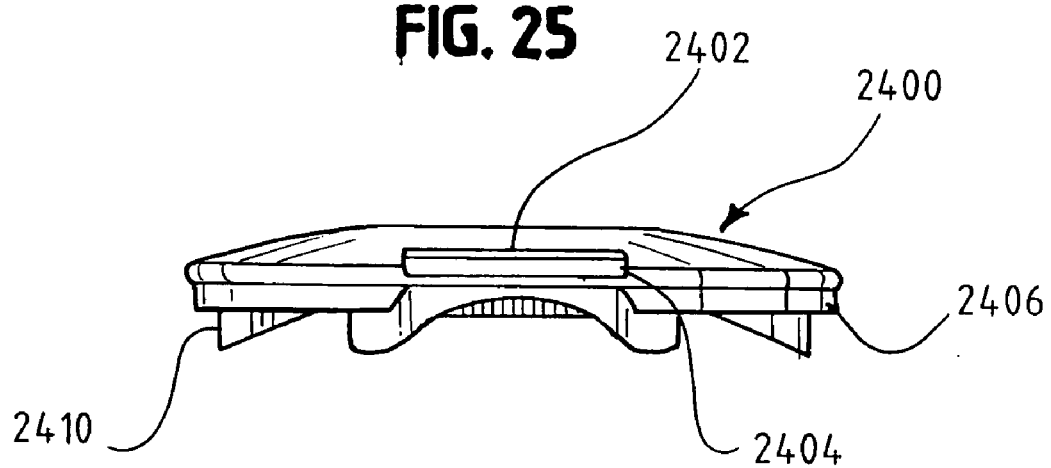
FIG. 25 is an elevational view of the filtrate splash cover similar to that of FIG. 24.
Figure 26:
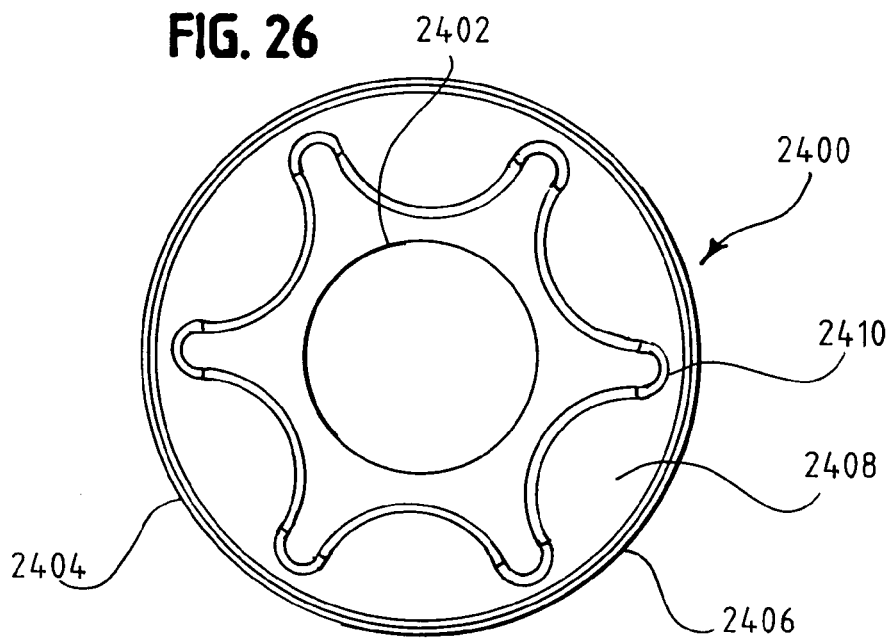
FIG. 26 is a bottom plan view of the filtrate splash cover similar to that of FIGS. 24 and 25.

At least one embodiment of the microwave beverage maker 800 includes a filtrate splash cover 2400, best viewed in FIGS. 24–26, which acts as a splash guard, adapted to prevent eruption and spill over, and break down bubbles, during the brewing process (i.e., upon the application of microwave energy). The filtrate splash cover 2400 acts as a splash guard, breaks down bubbles, and provides for venting. In an exemplary embodiment, filtrate splash cover 2400 has a generally rounded appearance when viewed from the top (best illustrated in FIG. 24) and a slightly convex appearance when viewed from the side (best illustrated in FIG. 25). The filtrate splash cover 2400 is formed to removably contact the top edge of the microwave beverage maker 800. As illustrated, the filtrate splash cover 2400 has a rounded top portion that defines a vent or hole 2402 (a center vent or hole) used to vent steam during and after the brewing process and a detent 2404 adapted to contact the deflector 800.

FIGS. 25 and 26 further depict a depending wall 2406 extending from an inner surface 2408 (extending into the beverage maker 800 for example), running substantially around the circumference of the cover 2400, and adapted to engage the top edge of the beverage maker 800 in a friction fit. Cover 2400 further includes at least one support rib 2410 that extends from the inner surface 2408 of the cover 2400 (inwardly into the beverage maker 800 for example). In the illustrated embodiment, the support rib 2410 runs around the hole 2402 and has a star-like pattern (although other arrangements or patterns are contemplated).

Figure 27:
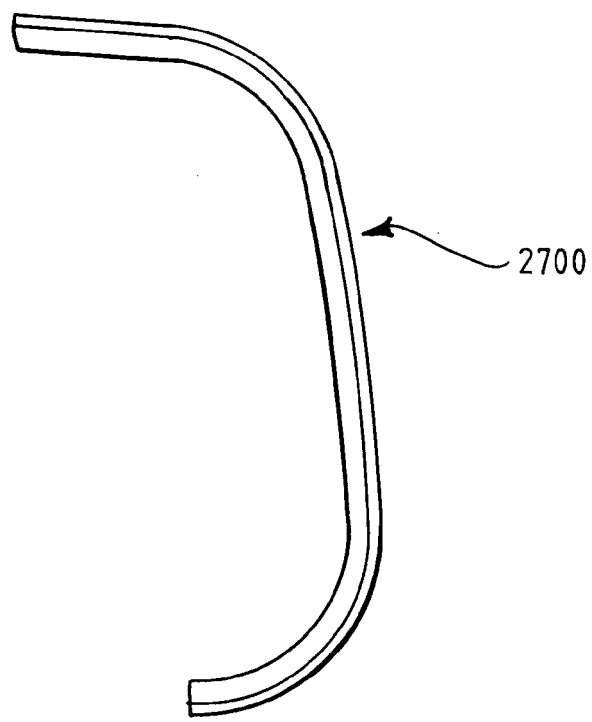
FIG. 27 is a side elevational view of a handle cover used with the handle of the microwavable beverage maker similar to that of FIG. 8.

FIG. 27 depicts a handle cover 2700 used with a microwavable beverage maker 800 similar to that of FIGS. 8 and 9. In at least one embodiment, the handle cover 2700 has a general U shape when viewed from the side. The handle cover 2700 is adapted to be removably or fixedly attached to the handle 814 of the microwavable beverage maker 800. In at least one embodiment, the handle cover 2700 is made of the same or different material as the microwavable beverage maker 800. As a separate entity, handle cover 2700 may provide a textured surface for grip and accent color.

Figure 28:
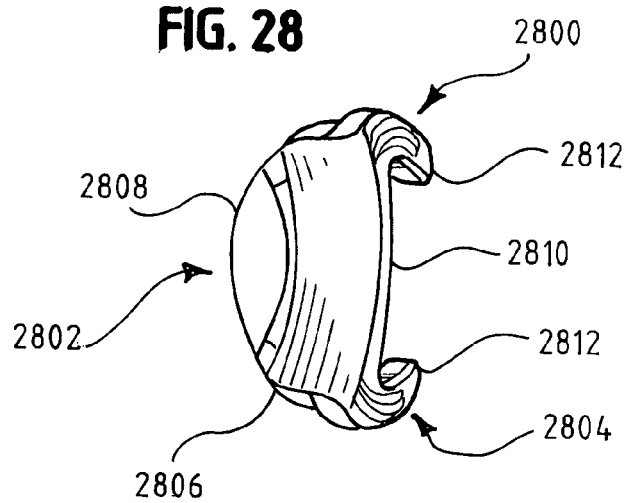
FIG. 28 is a top view of a deflector used with the microwavable beverage maker similar to that of FIG. 8.

It should be appreciated that the user may forget to use the filtrate splash cover 2400 during the brewing process (i.e., upon the application of microwave energy), which may result spill over into the microwave oven. Further, it is possible that the user might scald themselves if they try to drink the filtrate immediately upon removal from the microwave oven. At least one embodiment contemplates a deflector, depicted in FIGS. 28–30 and generally designated 2800, adapted to reduce or prevent spillover and scalding.

As depicted, deflector 2800 comprises deflection and affixing portions 2802 and 2804 respectively, joined or connected by connecting portion 2806. In at least one embodiment, deflection portion 2802 comprises a lip 2808 (a rounded lip is shown, but other shapes are contemplated) extending outward or away from connecting portion 2806. The connecting portion 2806 as shown is formed so that it is both curved and rounded to accommodate both the top edge and curvature of the beverage maker 800 in either a secured or removable fashion.

Figure 29:
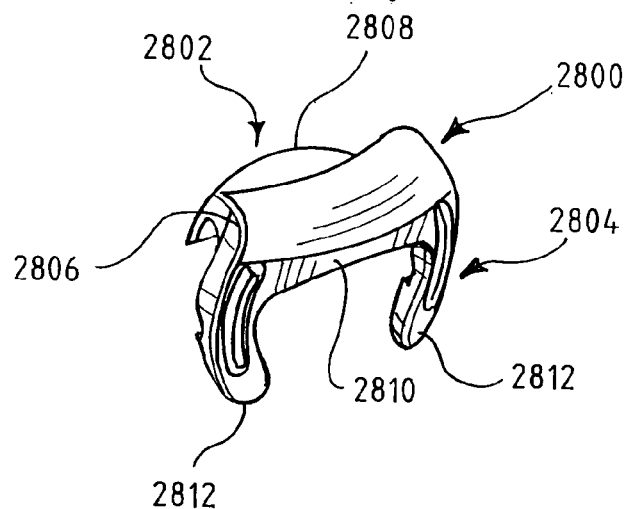
FIG. 29 is a perspective view of a deflector used with the microwavable beverage maker similar to that of FIG. 28.
Figure 30:
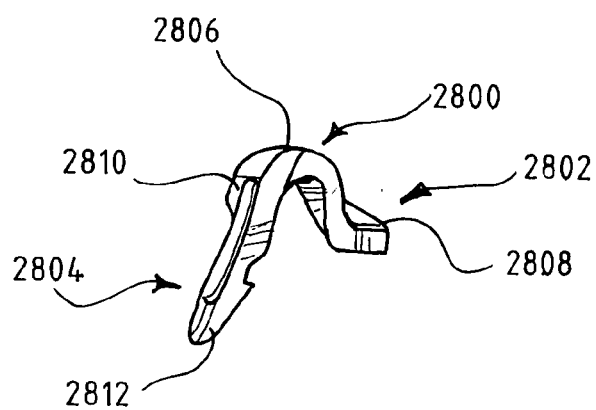
FIG. 30 is a side elevational view of a deflector used with the microwavable beverage maker similar to that of FIG. 8.

Referring to FIG. 29, one embodiment of the affixing portion 2804 of deflector 800 is illustrated. In this exemplary embodiment, affixing portion 2804 has a horseshoe like appearance and is adapted to contact at least a portion of the handle in a secured or removable fashion. The connection portion 2806 has connecting portion 2810 and at least one but generally two times 2812 that extend from connecting portion 2810. The affixing portion 2804 as shown is formed so that it is both curved and rounded to accommodate both the curvature of the beverage maker 800 and the handle 814 in either a secured or removable fashion. In one exemplary embodiment, deflector 2800 is adapted to clip to the handle 814.

Figure 31:
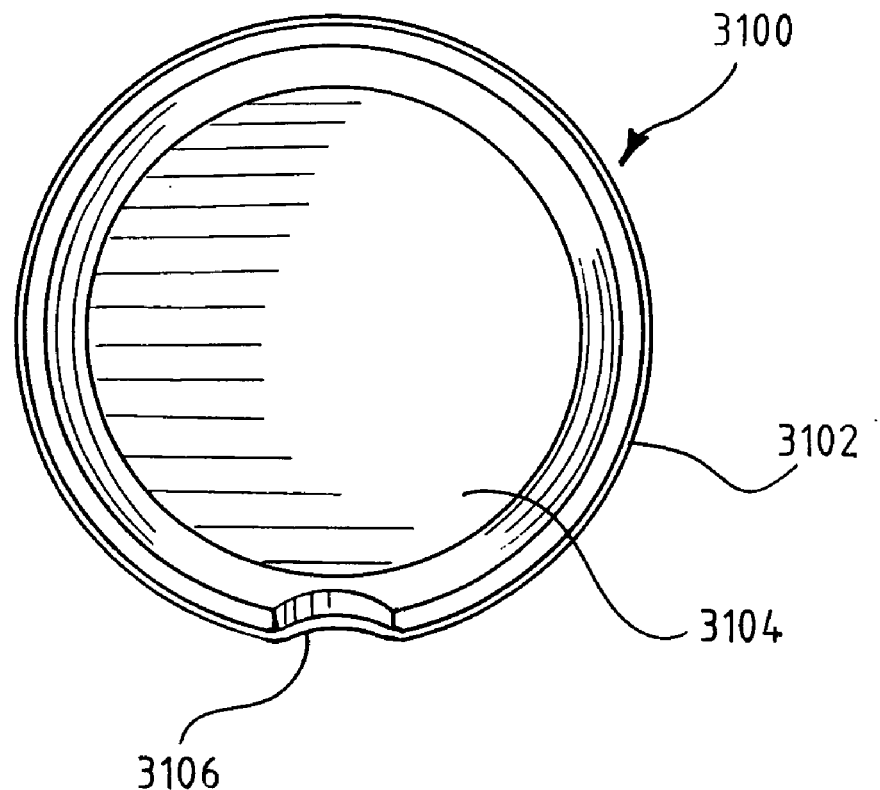
FIG. 31 is a top plan view of a liner used with a microwaveable beverage maker similar to that of FIG. 8.
Figure 32:
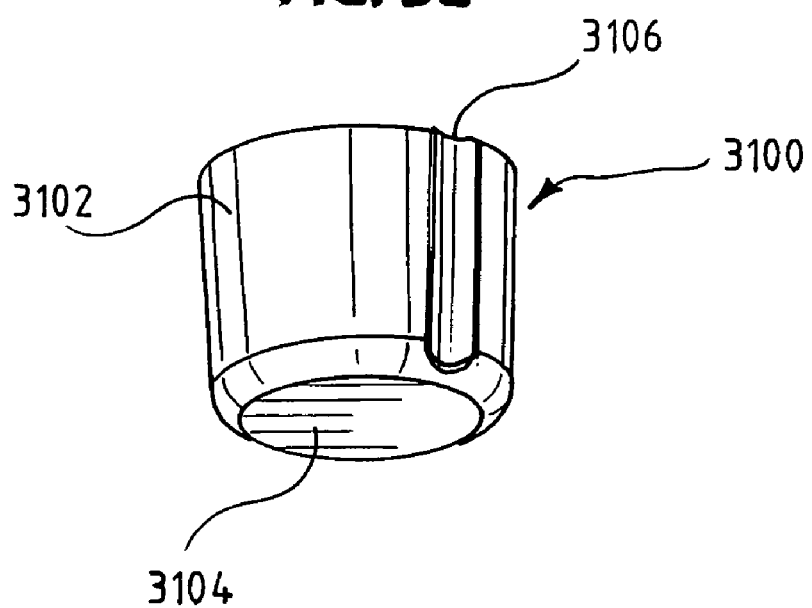
FIG. 32 is a side elevational view of a liner similar to that of FIG. 31.
Figure 33:
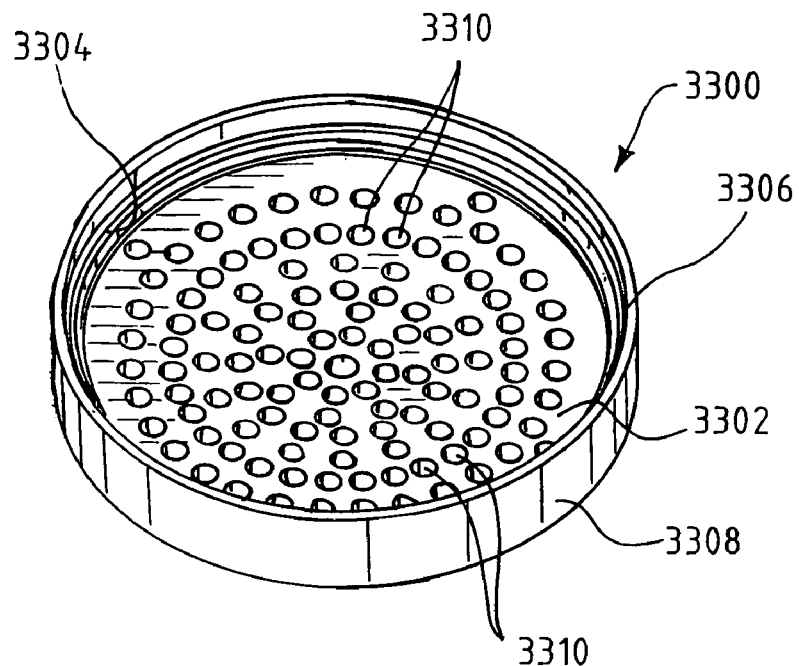
FIG. 33 is a top perspective view of a shield used with filter in a microwavable beverage maker similar to that of FIG. 8

It is contemplated that a user may dial a longer cycle than necessary to brew the liquid. This may result in overheating the liquid or filtrate. FIGS. 31 and 32 depict an embodiment of a liner or shield 3100. As illustrated, liner 3100 is generally cylindrical and formed by wall 3102 and surface 3104. In at least one embodiment, liner 3100 may be comprised of aluminum, other metallic substance or microwave reflective materials (not shown) to shield the brewed liquid from the microwave energy and control any overheating of the brewed coffee or espresso that would spoil the flavor.

Figure 34:
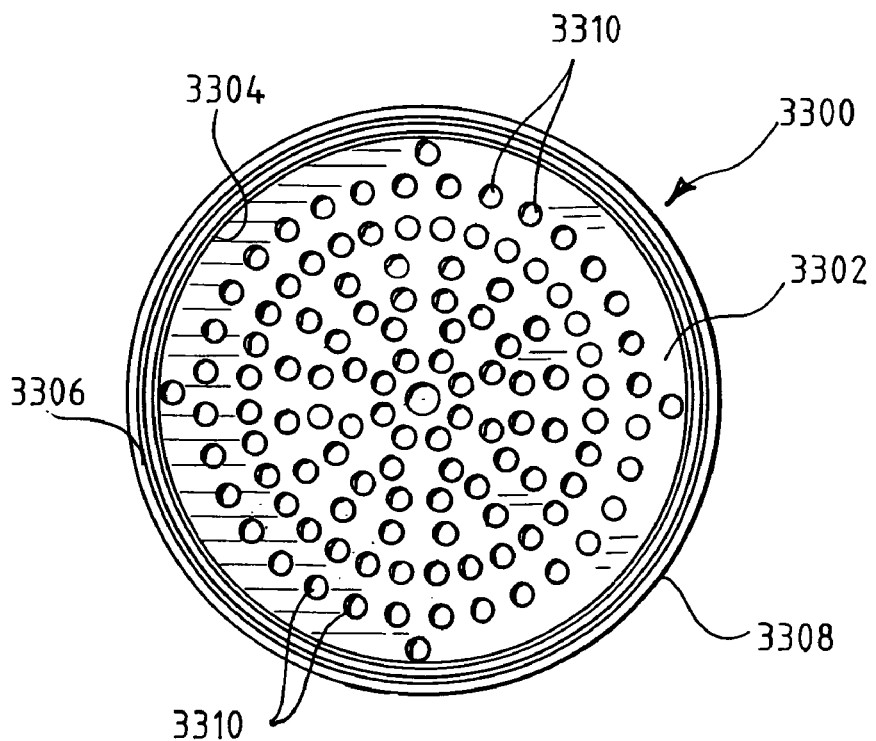
FIG. 34 is a plan view of the shield similar to that of FIG. 33.
Figure 35:
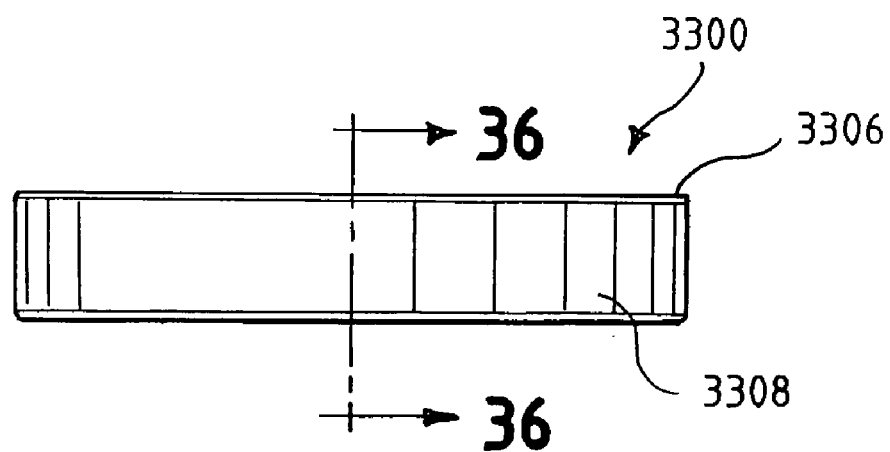
FIG. 35 is a side elevational view of the shield similar to that of FIG. 35
Figure 36:
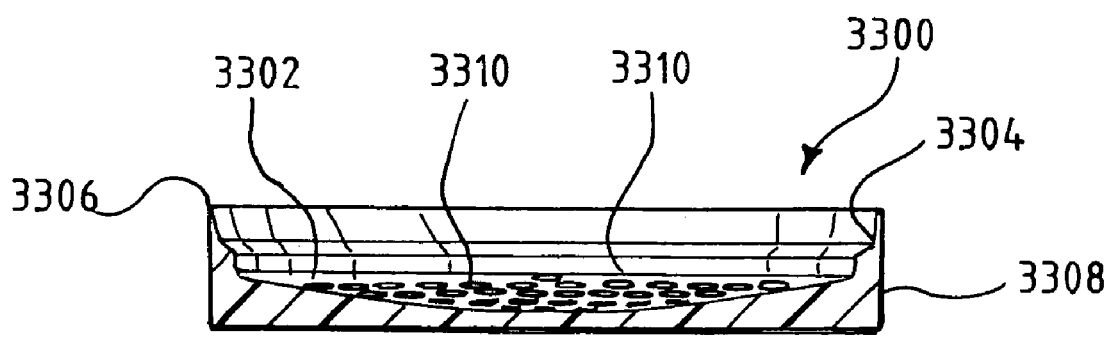
FIG. 36 is an elevational cross-sectional view of the shield of FIG. 35 taken along line 36—36.

FIGS. 33–36 depict an embodiment of the shield 3300 that may be used with the filter/pod compartment 818 (first or lower pod holder 1500 for example) as provided above. One purpose of shield 3300 is to prevent overheating of the coffee medium or pod in the eventuality the user forgets to put liquid in reservoir 838 but puts the machine in the microwave oven. In at least one embodiment, shield 3300 is adapted to fixedly or removable engage a portion of the filter/pod compartment 818 (either the first or lower pod holder 1500, the second or upper pod holder 1800 or both. Shield 3300 comprises surface 3302 (a depressed or concave surface for example) connected to wall 3304. In at least one embodiment, shield 3300 further comprises lip 3306 with wall 3308 extending there from. FIGS. 34 and 35 illustrate that the shield 3300 has a plurality of openings or perforations 3310 of a size and number sufficient to retain the particulate brewing substance, while allowing passage of steam and liquid.

FIGS. 34 and 35 further illustrate that the shield defines a plurality of openings or perforations 3310 of a size and number sufficient to retain the particulate brewing substance, while allowing the passage of steam and liquid. The size of the openings 3310 may range from about 0.020 to about 0.040 inches in diameter; although other sizes may be suitable depending on the size of the particulate brewing substance.

It should be appreciated that the microwaves have recognized physical characteristics. In RF energy applications, there is a direct relationship between the frequency (cycles per second or Hz) and the wavelength (physical size of the wave): the higher the frequency, the proportionately shorter the wavelength; and, the lower the frequency, the proportionately longer the wavelength. The small holes in the shield allow liquid to pass through. On the other hand, microwaves are low in frequency, thus they have a longer wavelength (at 2450 MHz, about 4 ¾ inches, in fact). Therefore, microwaves are simply too large to pass through the small holes in the shield. To the microwaves, these small perforations 3310 actually represent a solid metal wall that effectively blocks or reflects the microwaves back in the opposite direction.

One embodiment of the present invention uses filtrate pods (not shown) instead of loose particulate brewing substance (coffee for example) in the filtrate compartments 818. In one embodiment, the filtrate pod or pod comprises a disc or central area containing the particulate brewing substance. The particulate brewing substance (coffee for example) is trapped between two sheets of filter paper secured together (glued around a rim or edge for example). In at least one embodiment, the pod has a diameter greater than 25 mm but less than 80 mm, generally between about 50 mm to about 75 mm in diameter. One exemplary embodiment has a diameter of about 72 mm, while the central area (containing the particulate brewing substance) has a diameter of about 60 mm and is about 10 mm thick. Another exemplary embodiment has a diameter of about 60 mm, while the diameter of the central area is about 48 mm and is about 12 mm thick. The central area generally protrudes equally on either side of the secured or glue area that is paper-thin. In at least one embodiment, the pods are individually sealed in a Poly square bag about 93 mm square. However, it is contemplated that any commercially available filtrate pods, having different dimensions than those describe previously, may be used.

To operate, ground coffee, tea, or other espresso particulate brewing substance, either loose, in a porous block form, contained in a paper bag or other filter, or in a filtrate pod as provided above, is placed within the filter/pod compartment 818. The lower pod holder 1500 is connected or attached to the edge of the upper pod holder 1800 (which is positioned within pod guide or pod wall 1801). The lower pod holder is, in at least one embodiment, positioned within the receptacle 1206 of the water reservoir 1204 such that the filter/pod compartment 818 is located generally in the flow path between the filtrate passage 820 and reservoir 838. A suitable quantity of water is poured into the reservoir 838, and the annular end of the circular bottom assembly 1200 is removably connected to the upper cup assembly 812 at connection 828. The gasket 2100 forms a substantial seal or seat between the filtrate passage 820 and the filter/pod compartment 818, where, in at least one embodiment, the gasket 2100 substantially closes the path for passage of liquid and steam from the filter/pod compartment 818 to the filtrate passage 820.

Upon application of the microwave energy, the liquid (water for example) in the reservoir 838 heats up, vapor forms, and the pressure increases. When the pressure within the filter/pod compartment 818 reaches a predetermined level (approximately 5 psi for example). The steam pressure forces hot liquid and steam to rise upwards through the filter/pod compartment 818, the particulate brewing substance, the gasket central hole, the filtrate passage 820 and into the filtrate reservoir 816. In at least one embodiment a filtrate splash cover 2400 is removably connected to an upper portion of upper cup assembly 812. The filtrate splash cover 2400 serves to break up bubbles and contain steam within the filtrate reservoir 816, where it may cool and condense, while the deflector deflects liquid into the filtrate reservoir 816. The filtrate splash cover 2400 thereby limits the undesired escape of fluid and steam into the microwave oven. The process continues until most of the water has been discharged into the filtrate reservoir 816. Espresso may be brewed in approximately two to three minutes, depending upon the power of the oven, the quantity of espresso being brewed, and the atmosphere conditions.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. For example, multiple piece components may be utilized in lieu of an integrally molded assembly. Alternate types of filter splash covers can be used. Different shapes and configurations of the filter/pod compartment, filters, water reservoir, water reservoir receptacle, filtrate passage, filtrate reservoir, bottom cover, and handle may be used as a matter of design choice to practice the present invention. Therefore, it is intended that the invention not be limited to the particular embodiment disclosed, but that the invention will include all embodiments falling within the scope of the appended claims.

What is claimed is:

1. A device for making individually-sized servings of heated beverages using microwave energy, the device comprising:

a bottom cover including a liquid reservoir capable of containing a liquid;

a pod compartment comprising a first pod holder and a second pod holder, wherein the pod compartment is adapted to receive a particulate brewing substance and substantially retain said particulate brewing substance while permitting the passage of liquid and steam, wherein at least said first pod holder is removably mounted in said bottom cover and is adapted to receive said second pod holder in a removable manner, and wherein at least said first pod holder comprises a least one rib formed therein;

a filtrate reservoir having a liner mounted therein, at least said filtrate reservoir fluidly coupled to at least said liquid reservoir; and a gasket removably coupled to at least said pod compartment, said gasket comprising:

a brewing valve for metering a flow of said liquid and steam; and a pressure regulator valve for relieving sudden pressure surges;

whereby, upon application of microwave energy, said liquid and steam located in said liquid reservoir is pressurized and directed through at least said pod compartment to said filtrate reservoir forming the heated beverages.

2. The device of claim 1, wherein said first pod holder is rotatably removably mounted in said bottom cover.

3. The device of claim 1 wherein said first pod holder has at least one pin receptacle adapted to receive a pin in said bottom cover.

4. The device of claim 3 wherein said pod compartment is adapted to removably receive said particulate brewing substance.

5. The device of claim 1, wherein said first pod holder comprises a plurality of ribs that limit the amount of space in said first pod holder available for the liquid or water.

6. The device of claim 1 comprising a filter shield adapted to enable passage of said liquid and steam and deflect microwave energy.

7. The device of claim 1 comprising at least one filtrate passage fluidly communicating with at least said liquid reservoir and said filtrate reservoir.

8. The device of claim 7 comprising a deflector communicating with at least said filtrate passage and adapted to deflect the heated beverages.

9. The device of claim 1 comprising a filtrate splash cover detachably connected to said filtrate reservoir for deflecting liquid into said filtrate reservoir.

10. The device of claim 1 wherein said liner is comprised of a microwave reflective material.

11. The device of claim 1, further comprising a filtrate pod adapted to be contained within the pod compartment, the filtrate pod comprising:

a first sheet of a porous material having an outer edge; and a second sheet of a porous material having an outer edge, whereby said outer edge of said first sheet is secured to said outer edge of said second sheet forming a disk or central area adapted to contain said particulate brewing substance.

12. The device of claim 11 further wherein at least one of said first and second sheets having an outer diameter between about 25 mm and about 80 mm.

13. The device of claim 1, wherein the second pod holder comprises at least one rib formed therein.

14. The device of claim 1, wherein the upper pod holder comprises at least one annular ring for engaging a filtrate pod.

15. The device of claim 14, wherein the at least one annular ring of the upper pod holder is adapted to engage pods of various sizes and prevent liquid from bypassing the pod.

16. The device of claim 15 wherein the first pod holder is removably mounted in the bottom cover, and wherein the first pod holder is rotatable about a pin in the bottom cover when it is mounted in the bottom cover.

17. A device for making individually-sized servings of heated beverages using microwave energy, the device comprising:

an upper cup assembly defining at least one filtrate passage and a filtrate reservoir having a liner mounted therein, at least said filtrate reservoir fluidly coupled to at least said at least one filtrate passage;

a bottom cover including a liquid reservoir capable of containing a liquid, said liquid reservoir fluidly coupled said at least one filtrate passage;

a pod compartment comprising a first pod holder and a second pod holder, wherein the pod compartment is adapted to receive a particulate brewing substance and substantially retain said particulate brewing substance while permitting the passage of liquid and steam, wherein at least said first pod holder is removably mounted in said bottom cover and is adapted to receive said second pod holder in a removable manner, and wherein at least said first pod holder comprises a least one rib formed therein; and a gasket removably coupled to at least said pod compartment, said gasket comprising:

a brewing valve for metering a flow of said liquid and steam; and a pressure regulator valve for relieving sudden pressure surges;

whereby, upon the application of microwave energy, liquid and steam located in said liquid reservoir is pressurized and directed through at least said pod compartment to said filtrate reservoir forming the heated beverages.

18. The device of claim 17, wherein said first pod holder is rotatably removably mounted in said bottom cover.

19. The device of claim 17 wherein said first pod holder has at least one pin receptacle adapted to receive a pin in said bottom cover.

20. The device of claim 17, wherein said first pod holder comprises a plurality of ribs that limit the amount of space in said first pod holder available for the liquid or water.

21. The device of claim 17 comprising a filter shield coupled to at least a portion of said pod compartment and adapted to enable passage of said liquid and steam and deflect microwave energy.

22. The device of claim 17 comprising a deflector communicating with at least said filtrate passage and adapted to deflect the heated beverages.

23. The device of claim 17 comprising a filtrate splash cover detachably connected to said filtrate reservoir for deflecting liquid into the filtrate reservoir.

24. The device of claim 17 wherein said liner is comprised of a microwave reflective material.

25. The device of claim 17, further comprising a filtrate pod adapted to be contained within the pod compartment, the filtrate pod comprising:

a first sheet of a porous material having an outer edge; and a second sheet of a porous material having an outer edge, whereby said outer edge of said first sheet is secured to said outer edge of said second sheet forming a disk or central area adapted to contain said particulate brewing substance.

26. A method for making individually-sized servings of heated beverages using microwave energy, the method comprising:

filling at least a portion of a pod compartment with a particulate brewing substance, said pod compartment comprising a first pod holder and a second pod holder, wherein the pod compartment is adapted to receive a particulate brewing substance and substantially retain said particulate brewing substance while permitting the passage of liquid and steam, wherein at least said first pod holder is removably mounted in said bottom cover and is adapted to receive said second pod holder in a removable manner, and wherein at least said first pod holder comprises a least one rib formed therein;

placing said pod compartment within a water reservoir in a bottom cover, said water reservoir fluidly coupled with at least a filtrate reservoir having a removable liner;

engaging a gasket to at least said pod compartment, said gasket comprising a brewing valve for metering a flow of said liquid and a pressure regulator valve for relieving sudden pressure surges;

engaging said bottom cover to said water reservoir; and applying microwave energy to at least said combined water reservoir and bottom cover, filtrate reservoir, pod compartment and gasket such that said liquid is pressurized forming steam, both said pressured liquid and steam being forced through at least said pod compartment containing the particulate brewing substance and into said filtrate reservoir thereby brewing the heated beverage.

27. The method of claim 26 further comprising placing a filtrate pod into said pod compartment, said filtrate pod comprising:

a first sheet of a porous material having an outer edge; and a second sheet of a porous material having an outer edge, whereby said outer edge of said first sheet is secured to said outer edge of said second sheet forming a disk or central area adapted to contain said particulate brewing substance.

28. The method of claim 26, comprising limiting the amount of space in said first pod holder available for the liquid or water by using a plurality of ribs therein.

29. The method of claim 26 comprising deflecting microwave energy in at least said pod compartment using a filter shield.

30. The method of claim 26 comprising deflecting heated beverages into said filtrate reservoir using a deflector communicating with at least said filtrate passage.

31. A device for making individually-sized servings of heated beverages using microwave energy, the device comprising:

a bottom cover including a liquid reservoir capable of containing a liquid;

a pod compartment rotatably mounted in said bottom cover for holding a particulate brewing substance and for substantially retaining said particulate brewing substance while permitting the passage of liquid and steam;

a filtrate reservoir having a liner mounted therein, at least said filtrate reservoir fluidly coupled to at least said liquid reservoir; and a gasket removably coupled to at least said pod compartment, said gasket comprising:

a brewing valve portion comprising a first opening for metering a flow of said liquid and steam from the pod compartment and a second opening for relieving sudden pressure surges in the pod compartment and preventing chocking of the first opening; and a pressure regulator valve portion for relieving sudden pressure surges in the liquid reservoir;

whereby, upon application of microwave energy, said liquid and steam located in said liquid reservoir is pressurized and directed through at least said pod compartment to said filtrate reservoir forming the heated beverages.

32. The device of claim 31, wherein the pressure regulator valve portion comprises a valve comprising at least one slit.

33. The device of claim 32, wherein the pressure regulator valve portion controls the maximum pressure in the liquid reservoir.

* * * * *